(12) United States Patent
Choi et al.

(10) Patent No.: US 10,941,072 B2
(45) Date of Patent: Mar. 9, 2021

(54) FLUOROPHOSPHATE GLASSES FOR ACTIVE DEVICE

(71) Applicant: KOREA PHOTONICS TECHNOLOGY INSTITUTE, Gwangju (KR)

(72) Inventors: Ju Hyeon Choi, Gwangju (KR); Jung Whan In, Daejeon (KR); Yeon Hwang, Gwangju (KR); Young Bok Kim, Gyeongsangnam-do (KR)

(73) Assignee: KOREA PHOTONICS TECHNOLOGY INSTITUTE, Gwangju (KR)

( * ) Notice: Subject to any disclaimer, the term of this patent is extended or adjusted under 35 U.S.C. 154(b) by 0 days.

(21) Appl. No.: 16/465,432

(22) PCT Filed: May 19, 2018

(86) PCT No.: PCT/KR2018/005756
§ 371 (c)(1),
(2) Date: May 30, 2019

(87) PCT Pub. No.: WO2018/212631
PCT Pub. Date: Nov. 22, 2018

(65) Prior Publication Data
US 2020/0002218 A1   Jan. 2, 2020

(30) Foreign Application Priority Data

May 19, 2017   (KR) .................. 10-2017-0061909
May 17, 2018   (KR) .................. 10-2018-0056420

(51) Int. Cl.
*C03C 3/247*   (2006.01)
*C03C 4/12*    (2006.01)
*C03C 13/04*   (2006.01)

(52) U.S. Cl.
CPC ............... *C03C 3/247* (2013.01); *C03C 4/12* (2013.01); *C03C 13/048* (2013.01);
(Continued)

(58) Field of Classification Search
CPC .......... C03C 3/247; C03C 13/042; C03C 4/12
See application file for complete search history.

(56) References Cited

FOREIGN PATENT DOCUMENTS

CN   106186679 A   12/2016
JP   06-157068 A   6/1994
(Continued)

OTHER PUBLICATIONS

Goncalves et al. Structure-property relations in newfluorophosphate glasses singly-and co-doped with Er3+ and Yb3+. Materials Chemistry and Physics 157 (2015), pp. 45-55.*
(Continued)

*Primary Examiner* — Noah S Wiese
(74) *Attorney, Agent, or Firm* — Harness, Dickey & Pierce, P.L.C.

(57) ABSTRACT

The disclosed fluorophosphate glasses for an active device include: a metaphosphate composition including $Al(PO_3)_3$; a fluoride composition including $BaF_2$ and $SrF_2$; and a dopant composed of $ErF_3$ and $YbF_3$, and have thermal and mechanical properties to be able to be used as a glass base material for an active device (e.g., optical fiber laser), have a high emission cross-section characteristic, have a reinforced upconversion and downconversion emission characteristic, and have high sensitivity S in a cryogenic environment.

5 Claims, 31 Drawing Sheets

(52) U.S. Cl.
CPC .. *C03C 2201/14* (2013.01); *C03C 2201/3488* (2013.01); *C03C 2201/36* (2013.01)

(56) References Cited

FOREIGN PATENT DOCUMENTS

| | | |
|---|---|---|
| JP | 2014-091650 A | 5/2014 |
| KR | 10-2016-0048962 A | 5/2016 |

OTHER PUBLICATIONS

International Search Report from corresponding PCT Application No. PCT/KR2018/005756, dated Jan. 2, 2019.

\* cited by examiner

FLUOROPHOSPHATE GLASSES FOR ACTIVE DEVICE

CROSS-REFERENCE TO RELATED APPLICATIONS

This application is a national phase application of PCT Application No. PCT/KR2018/005756, filed on 19 May 2018, which claims the benefit and priority to Korean Patent Application Nos. 10-2017-0061909, filed on 19 May 2017 and 10-2018-0056420, filed on 17 May 2018. The entire disclosures of the applications identified in this paragraph are incorporated herein by references.

FIELD

The present disclosure relates to fluorophosphate glasses for an active device and, more particularly, to the composition of fluorophosphate glasses for an active device, the fluorophosphate glasses having thermal and mechanical properties to be able to be used as a glass base material for an optical fiber laser, having a high emission cross-section characteristic, having a reinforced upconversion and down-conversion emission characteristic, and having high sensitiveness S in a cryogenic environment.

BACKGROUND

This section provides background information related to the present disclosure which is not necessarily prior art.

In general, an erbium-doped fiber amplifier (EDFA), which is an optical fiber amplifier device that is used as an important device in not only a wavelength division multiplexing (WDM) communication system, but most optical networks, amplifies light having a wavelength between 1530 and 1610 nm by doping an optical fiber made of glass with erbium.

Fluorophosphate (FP) glass produced by mixing fluoride glass with phosphate has excellent thermal stability and chemical durability, low phonon energy, and excellent linearity of a light transmittance characteristic and a refractive index in a wide spectrum region from the ultraviolet ray to the near infrared ray, as compared with fluoride glass. Further, when a rare earth (RE) element is used as a dopant, high dopant concentration can be achieved by providing multiple energy levels, so the fluorophosphate glass is a glass base material that can achieve high efficiency even using a short cavity.

Meanwhile, ytterbium (Yb) provides a considerably high absorption cross section in the region of 980 nm, and is used as a sensitizer of laser excitation by being co-doped with erbium (Er) because overlap of the energy level of a donor ($^2F_{5/2}$, $Yb^{3+}$) and the energy level of an acceptor ($^4I_{11/2}$, $Er^{3+}$).

The application range of the fluorophosphate glass co-doped with Er/Yb having these excellent characteristics, in order to use the excellent characteristics described above, has been increased recently up to not only existing applications such as a visible light or infrared laser, an optical fiber amplifier, an optical storage device, and a submarine optical communication network, but a 3D space observation system that requires high output, an eye-safe light source (1550 nm), and light weight such as LiDAR (Light Detection and Ranging).

Further, a green color having a wavelength of 500 nm band and a red color having a wavelength of 600 nm band are used in fields such as a biotechnology and data storage.

In order to be used in this wide application field, it is required to develop a fluorophosphate glass base material that can achieve high pulse output even if the size of a device is reduced. Further, it is required to use an upconversion phenomenon in order to emit a wavelength of 500 to 600 nm using a laser excitation system of 980 nm.

SUMMARY

Technical Problem

An object of the present disclosure is to provide fluorophosphate glasses for an active device, the fluorophosphate glasses having thermal and mechanical properties to be able to be used as a glass base material for an active device (e.g., an optical fiber laser), having a high emission cross-section characteristic, having a reinforced upconversion and down-conversion emission characteristic, and having high sensitivity S in a cryogenic environment.

Technical Solution

This section provides a general summary of the disclosure and is not a comprehensive disclosure of its full scope or all of its features.

In order to achieve the objects, fluorophosphate glasses for an active device according to an aspect of the present disclosure includes: a metaphosphate composition including $Al(PO_3)_3$; a fluoride composition including $BaF_2$ and $SrF_2$; and a dopant composed of $ErF_3$ and $YbF_3$.

In the fluorophosphate glasses for an active device according to an aspect of the present disclosure, the $YbF_3$ may be about 3 mol % to about 5 mol %.

In the fluorophosphate glasses for an active device according to an aspect of the present disclosure, the $ErF_3$ may be about 3 mol % and $YbF_3$ may be about 3 mol % to about 5 mol %.

In the fluorophosphate glasses for an active device according to an aspect of the present disclosure, the $Al(PO_3)_3$ may be about 20 mol % to about 30 mol %, the $BaF_2$ may be about 10 mol % to about 60 mol %, and the $SrF_2$ may be about 10 mol % to about 70 mol %.

In the fluorophosphate glasses for an active device according to an aspect of the present disclosure, the $Al(PO_3)_3$ may be about 20 mol %, the $BaF_2$ may be about 40 mol % to about 60 mol %, and the $SrF_2$ may be about 20 mol % to about 40 mol %.

In the fluorophosphate glasses for an active device according to an aspect of the present disclosure, the $ErF_3$ may be about 3 mol % and $YbF_3$ may be about 3 mol % to about 5 mol %.

In the fluorophosphate glasses for an active device according to an aspect of the present disclosure, the $Al(PO_3)_3$ may be about 20 mol %, the $BaF_2$ may be about 60 mol %, and the $SrF_2$ may be about 20 mol %.

In the fluorophosphate glasses for an active device according to an aspect of the present disclosure, the $ErF_3$ may be about 3 mol % and $YbF_3$ may be about 3 mol % to about 5 mol %.

In the fluorophosphate glasses for an active device according to an aspect of the present disclosure, the $Al(PO_3)_3$ may be about 20 mol %, the $BaF_2$ may be about 50 mol %, and the $SrF_2$ may be about 30 mol %.

In the fluorophosphate glasses for an active device according to an aspect of the present disclosure, the $ErF_3$ may be about 3 mol % and $YbF_3$ may be about 3 mol % to about 5 mol %.

In the fluorophosphate glasses for an active device according to an aspect of the present disclosure, the $Al(PO_3)_3$ may be about 20 mol %, the $BaF_2$ may be about 40 mol %, and the $SrF_2$ may be about 40 mol %.

Advantageous Effects

According to the present disclosure, thermal properties including glass transition temperature (tg) and peak temperature (tp), thermomechanical properties including coefficient of thermal expansion (CTE), and mechanical properties including Knop hardness are improved, so there is provided an advantage in the process of manufacturing an active device including an optical fiber laser.

According to the present disclosure, there is an effect of being able to achieve high pulse output even if the size of a device decreases by achieving a high emission cross-section characteristic.

According to the present disclosure, there is an effect of increasing the lifetime of carriers at a metastable state energy level that is stimulated-emitted due to an effective energy transfer phenomenon by the composition optimization of dopants (e.g., Er and Yb).

According to the present disclosure, there is an effect of reinforcing downconversion and upconversion emission characteristics by the composition optimization of dopants (e.g., Er and Yb).

According to the present disclosure, it is possible to obtain a glass base material for an active device which has excellent sensitivity at cryogenic temperature. Therefore, it is possible to provide an active device that can be used in a cryogenic environment.

DETAILED DESCRIPTION

Hereafter, embodiments of achieving fluorophosphate glasses for an active device according to the present disclosure are described in detail with reference to the drawings.

However, it should be understood that the spirit of the present disclosure is not considered as being limited to the embodiments described below and those skilled in the art may easily propose various embodiments included in the same spirit as the present disclosure through changing and modifying, but the changes and modification are included in the spirit of the present disclosure.

Further, the terms to be used hereafter are selected for the convenience of description and should be appropriately construed as meanings coinciding with the spirit of the present disclosure, not being limited to the meanings in dictionaries when finding out the spirit of the present disclosure.

Fluorophosphate glasses according to the present embodiment have $Al(PO_3)_3$—$BaF_2$—$(Sr, Ca, Mg)F_2$ as a base material. In detail, the inventor(s) proposes the composition of fluorophosphate glasses composed of $ErF_3$—$YbF_3$—Al $(PO_3)_3$—$BaF_2$—$SrF_2$ or has these compositions as a base material as characteristic of the present disclosure.

Accordingly, as for $Al(PO_3)_3$—$BaF_2$—$(Sr, Ca, Mg)F_2$-based glass, by satisfying thermal and mechanical property conditions that can be applied to glass for an active device (e.g., an optical fiber laser) and optimizing the composition ratio (mol %) of a dopant composed of $Er^{3+}$ and $Yb^{3+}$, a high emission cross-section characteristic is achieved such that an effect that can achieve high pulse output even if the size of devices is reduced can be derived.

Figure 1A:
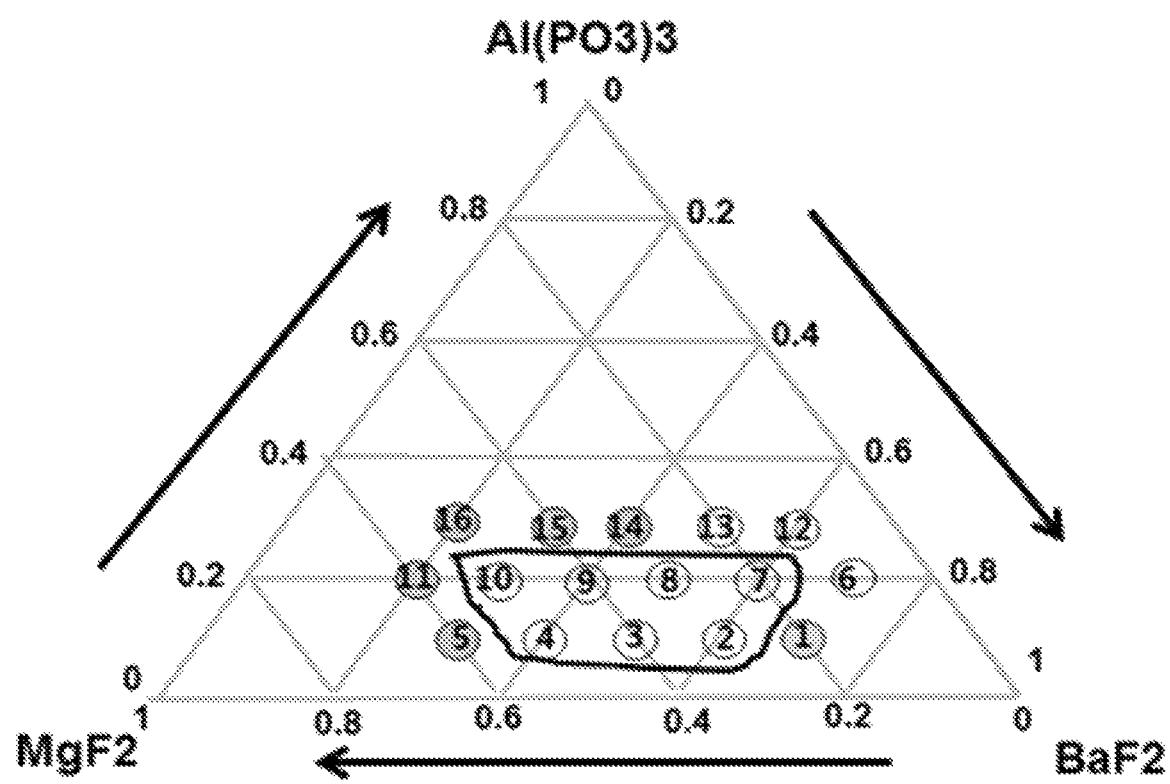
FIGS. 1A, 1B, and 1C are diagrams of glass composition design of $Al(PO_3)_3$—$BaF_2$—$(Sr, Ca, Mg)F_2$.
Figure 1B:
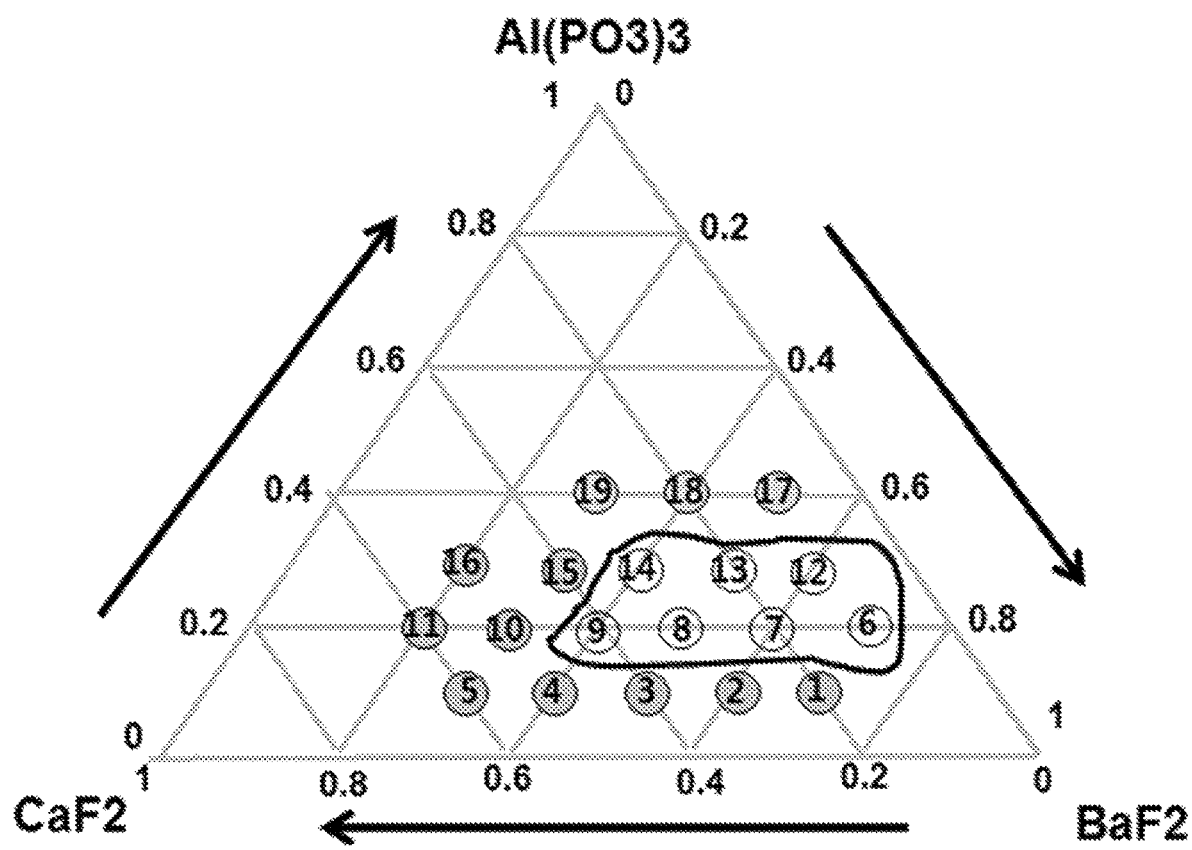
Figure 1C:
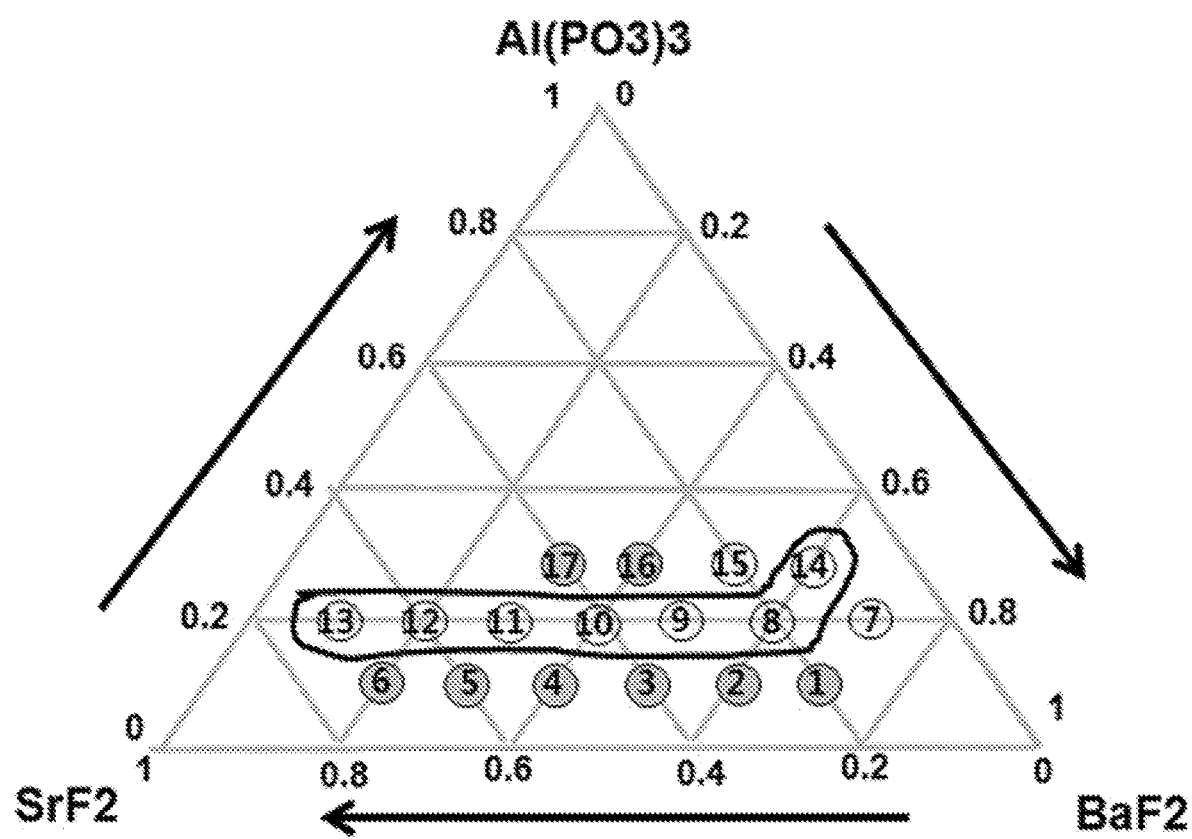

FIGS. 1A, 1B, and 1C are diagrams of glass composition design of $Al(PO_3)_3$—$BaF_2$—$(Sr, Ca, Mg)F_2$.

Referring to FIGS. 1A, 1B, and 1C, it can be seen that a sample composition determined on the basis of a glass forming region in a material combination of fluorophosphate glasses that uses $Al(PO_3)_3$ as phosphate and is used as each of a fluorine compound of strontium (Sr), calcium (Ca), and magnesium (Mg).

In FIGS. 1A, 1B, and 1C, it is the sample composition positioned in a black boundary (closed curve) and suitability as a glass base material for an active device is checked by analyzing thermal and mechanical property changes according to a change of the composition ratio (mol %) of each composition.

Figure 2A:
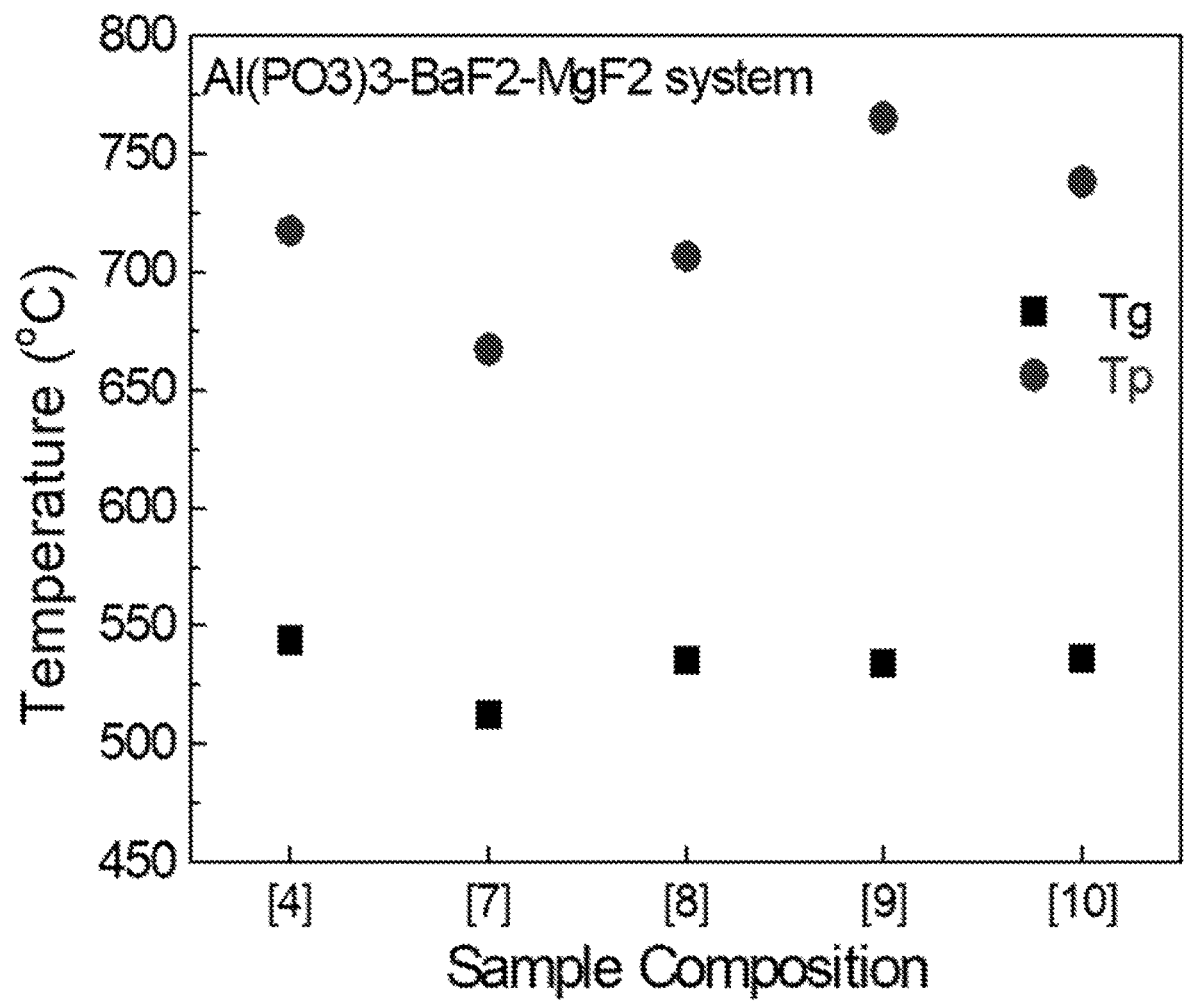
FIGS. 2A, 2B, and 2C are diagrams showing test results of thermal property estimation of $Al(PO_3)_3$—$BaF_2$—$(Sr, Ca, Mg)F_2$.
Figure 2B:
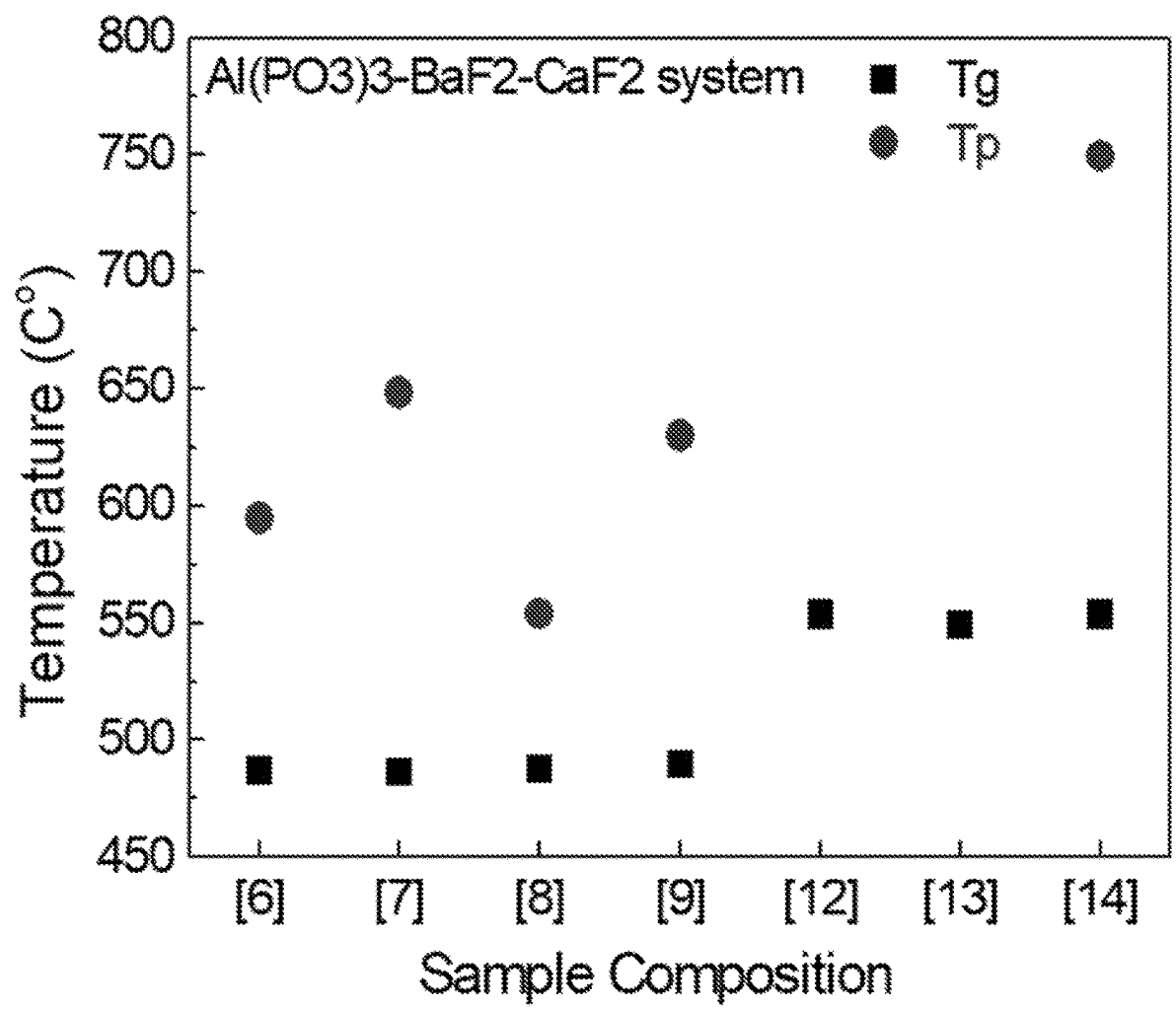
Figure 2C:
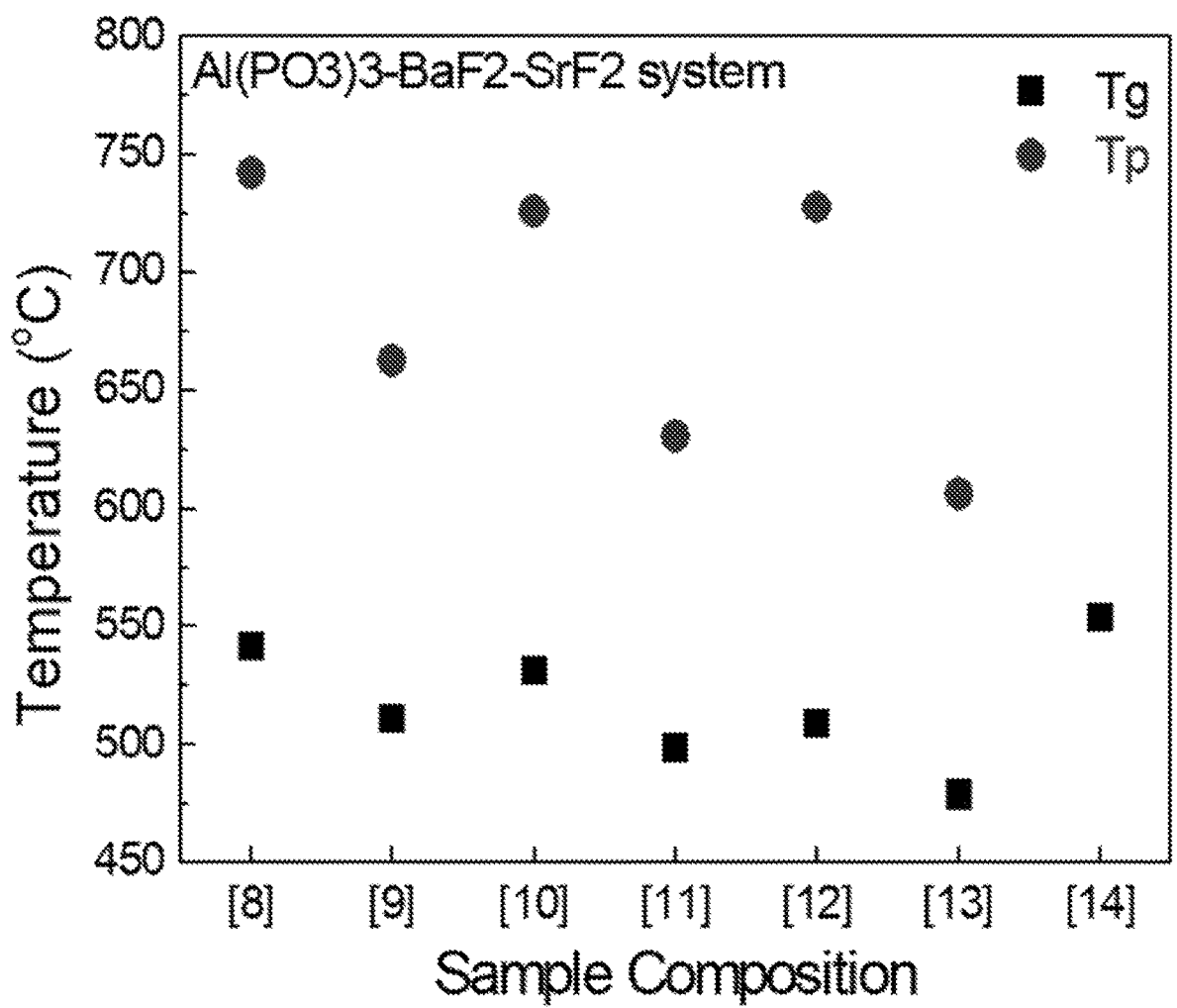
Figure 3A:
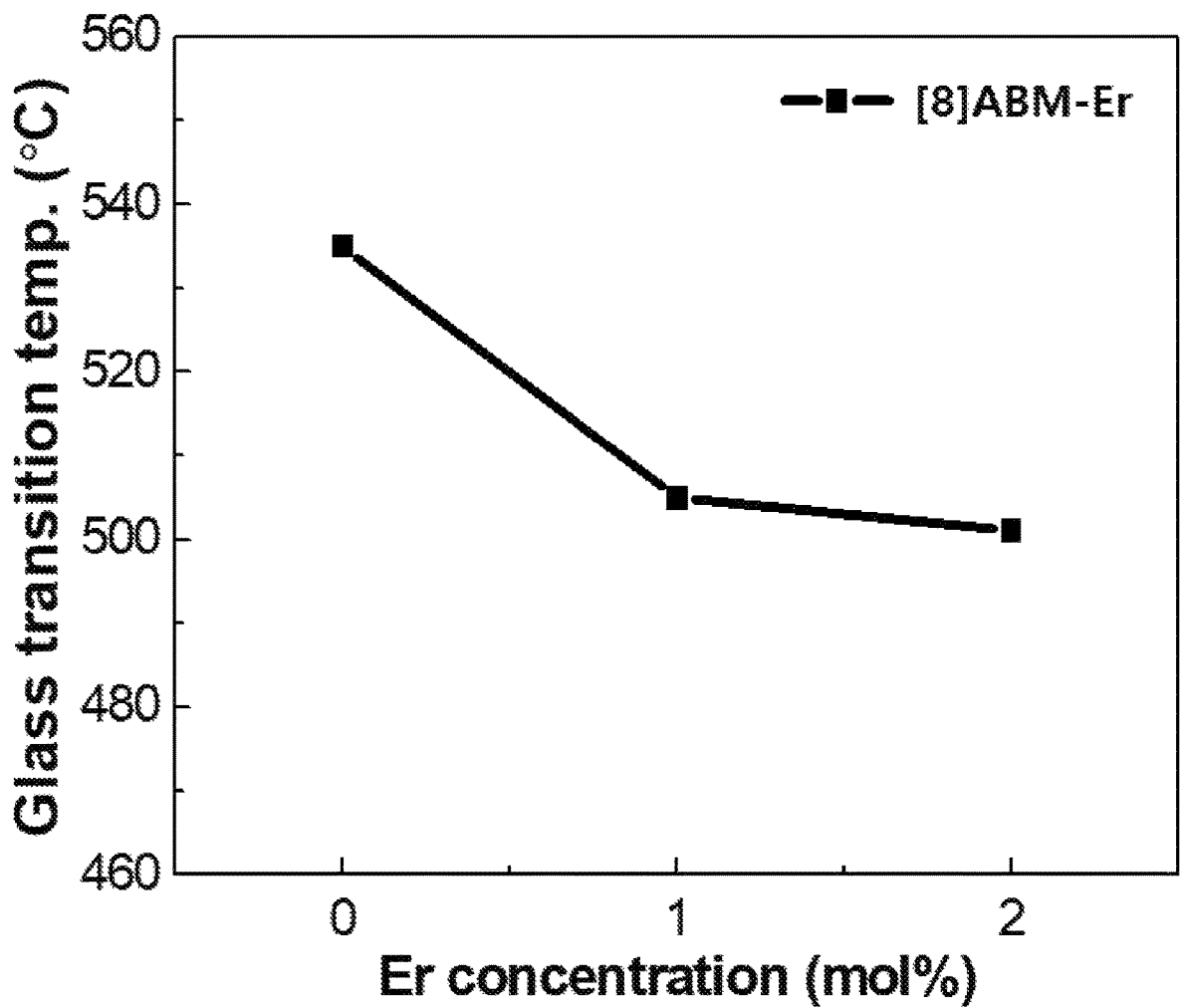
FIGS. 3A, 3B, and 3C are diagrams showing test results of thermal property estimation of $ErF_3$—$Al(PO_3)_3$—$BaF_2$—$(Sr, Ca, Mg)F_2$.
Figure 3B:
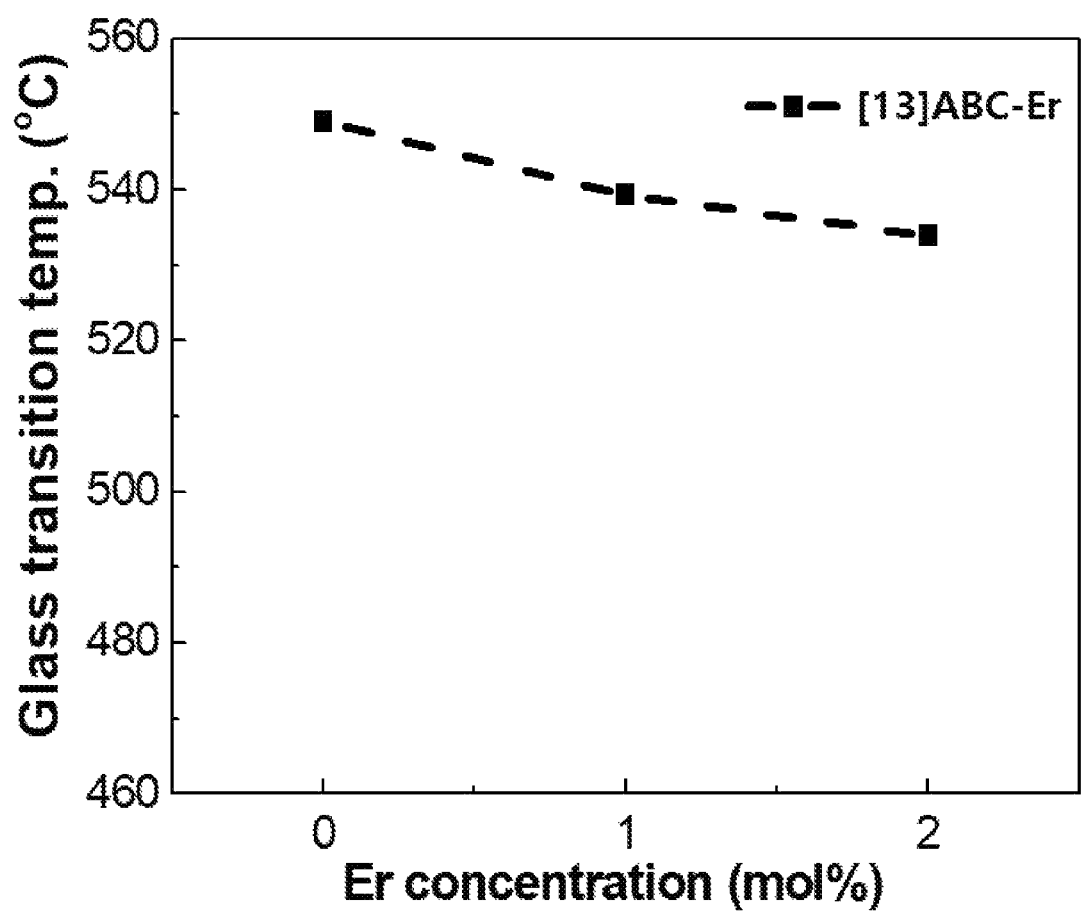
Figure 3C:
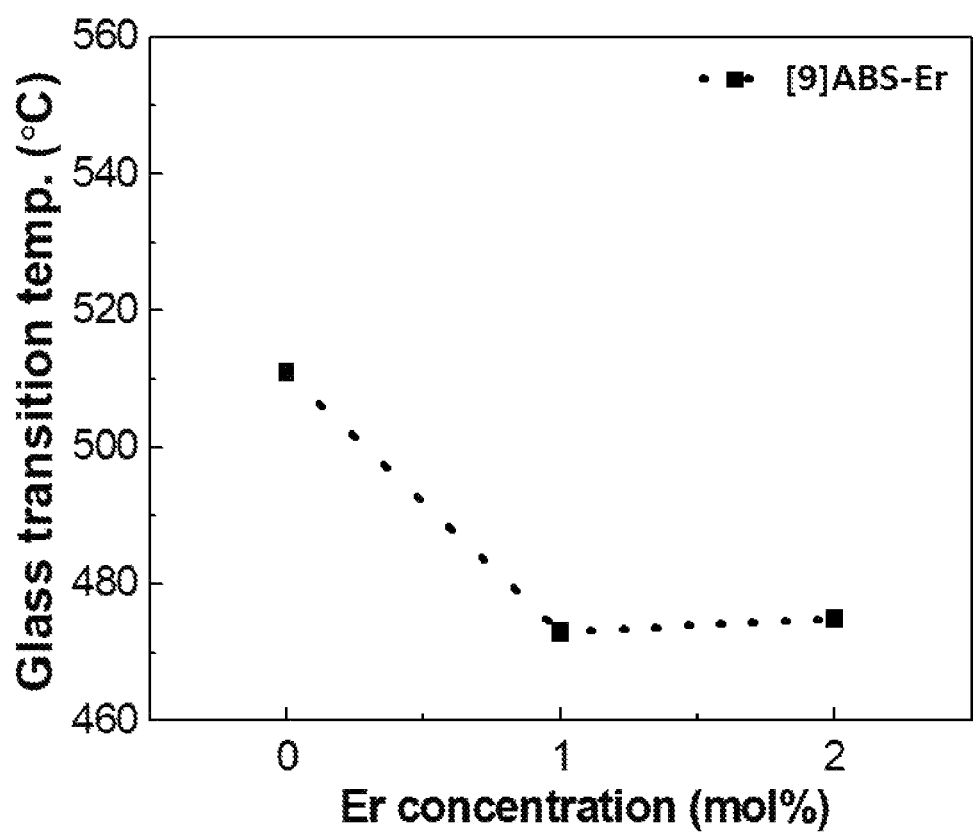

FIGS. 2A, 2B, and 2C are diagrams showing test results of thermal property estimation of $Al(PO_3)_3$—$BaF_2$—$(Sr, Ca, Mg)F_2$ and FIGS. 3A, 3B, and 3C are diagrams showing test results of thermal property estimation of $ErF_3$—$Al(PO_3)_3$—$BaF_2$—$(Sr, Ca, Mg)F_2$.

An optical fiber is manufactured by reheating and drawing a glass base material manufactured in an ingot shape at predetermined temperature and at a predetermined speed.

Accordingly, glass transition temperature Tg and peak temperature Tp are important factors that determine difficulty and yield of a process of glass base materials for manufacturing optical fibers.

Referring to FIGS. 2A, 2B, and 2C, it can be seen in $Al(PO_3)_3$—$BaF_2$—$MgF_2$-base glass, as the content of $MgF_2$ increases instead of $BaF_2$, the change of the glass transition temperature Tg is not large and it can be also seen in $Al(PO_3)_3$—$BaF_2$—$CaF_2$-based glass, as the content of $CaF_2$ increases instead of $BaF_2$ from the sample composition 6 to the sample composition 7, there is little change in the glass transmission temperature Tg.

Further, as the content of $SrF_2$ increases from 0.2 mol % to 0.7 mol % instead of $BaF_2$ from the sample composition 8 to the sample composition 14 in a $Al(PO_3)_3$—$BaF_2$—$SrF_2$-based glass composition candidate, there is no thermal property displacement behavior tendency, so it is determined as relatively slight.

Accordingly, in $Al(PO_3)_3$—$BaF_2$—$(Sr, Ca, Mg)F_2$-based glass, a change in the composition has low influence on the difficulty and yield of a drawing process in manufacturing of an optical fiber, so there is the advantage that the composition optimization for adjusting other characteristics is possible.

Meanwhile, it can be seen that the content of $Al(PO_3)_3$ that is a network former increases from 0.2 mol % to 0.3 mol %, the structure of rigidity relatively increases and the glass transition temperature increases, so there is a limit in a composition change range of the content of $Al(PO_3)_3$.

Referring to FIGS. 3A, 3B, and 3C, it can be seen that as $ErF_3$ increases in $ErF_3$—$Al(PO_3)_3$—$BaF_2$—$MgF_2$-based glass of (0.01, 0.02) mol %, the glass transition temperature linearly decreases and the same tendency can be also seen in $ErF_3$—$Al(PO_3)_3$—$BaF_2$—$CaF_2$-based glass of (0.01, 0.02) mol % and $ErF_3$—$Al(PO_3)_3$—$BaF_2$—$SrF_2$-based glass of (0.01, 0.02) mol %.

In general, when rare earth ions are added, a phenomenon that is opposite to the phenomenon that glass transition temperature relatively increases is shown.

Further, it is shown that as $ErF_3$ increases in $ErF_3$—$Al(PO_3)_3$—$BaF_2$—$MgF_2$-based glass of (0.01, 0.02) mol %, the glass transition temperature linearly decreases and it can be seen that the same tendency can be also seen in $ErF_3$—$Al(PO_3)_3$—$BaF_2$—$CaF_2$-based glass of (0.01, 0.02) mol % and $ErF_3$—$Al(PO_3)_3$—$BaF_2$—$SrF_2$-based glass of (0.01, 0.02) mol %.

Figure 4:
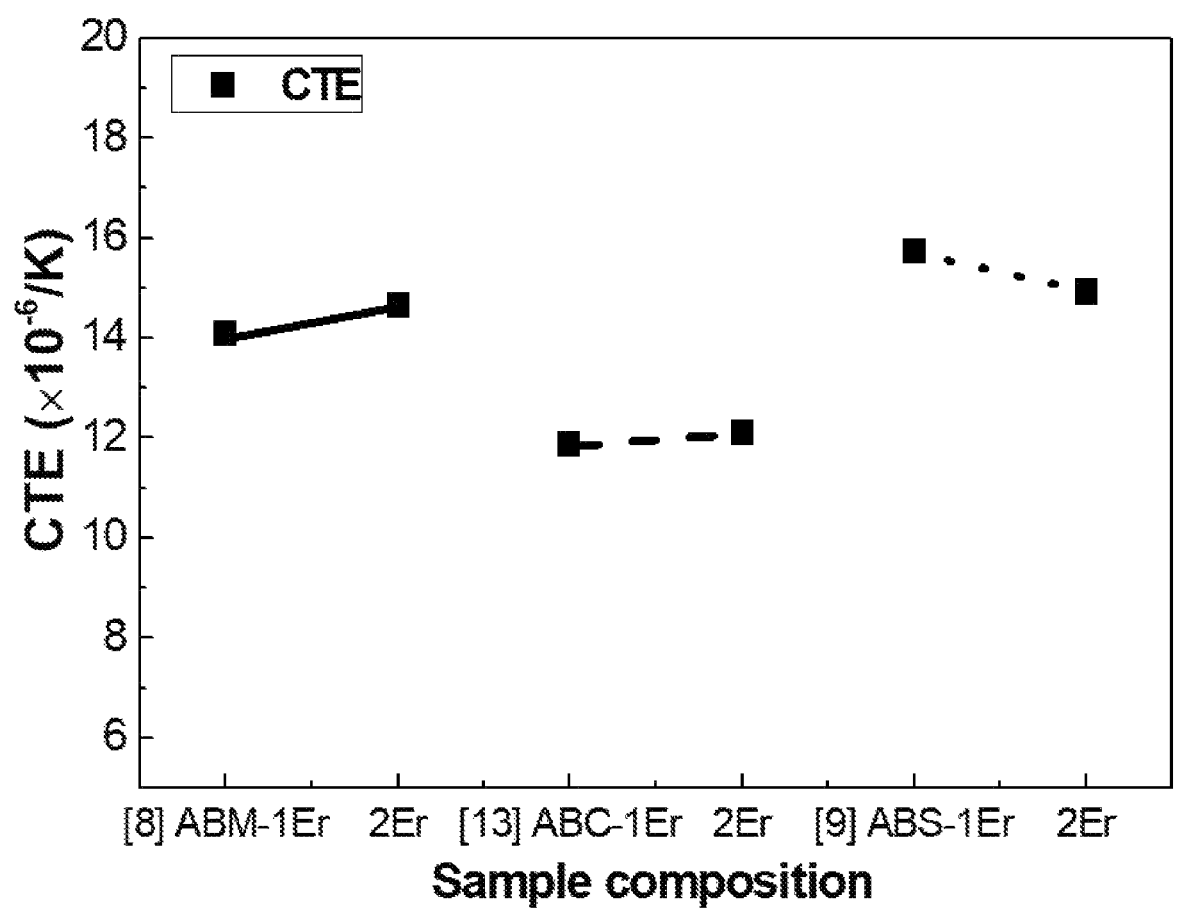
FIG. 4 is a diagram showing a test result of thermomechanical property estimation according to a composition change of $Al(PO_3)_3$—$BaF_2$—$(Sr, Ca, Mg)F_2$.

FIG. 4 is a view showing a test result of thermal, mechanical property estimation according to a composition change of $ErF_3$-doped $Al(PO_3)_3$—$BaF_2$—$(Sr, Ca, Mg)F_2$.

When an optical fiber expands or contracts in accordance with external temperature, the transmission characteristic of a communication system is obviously deteriorated and a change of a gain characteristic is caused in an optical fiber laser or an optical fiber amplifier, so it is preferable that a coefficient of thermal expansion is small.

Referring to FIG. 4, as for the coefficient of thermal expansion (CTE) by $Er^{3+}$ doping, the change tendency of the coefficient of thermal expansion according to the amount of $Er^{3+}$ doping in $Al(PO_3)_3$—$BaF_2$—$MgF_2$-based glass and $Al(PO_3)_3$—$BaF_2$—$CaF_2$-based glass is also similarly shown in $Al(PO_3)_3$—$BaF_2$—$SrF_2$-based glass. Accordingly, it can be found out that when the $Al(PO_3)_3$—$BaF_2$—$SrF_2$-based glass is applied to an optical fiber laser or an optical fiber amplifier, a characteristic that is advantageous for interfacial bonding of a core and a cladding would be obtained.

Figure 5A:
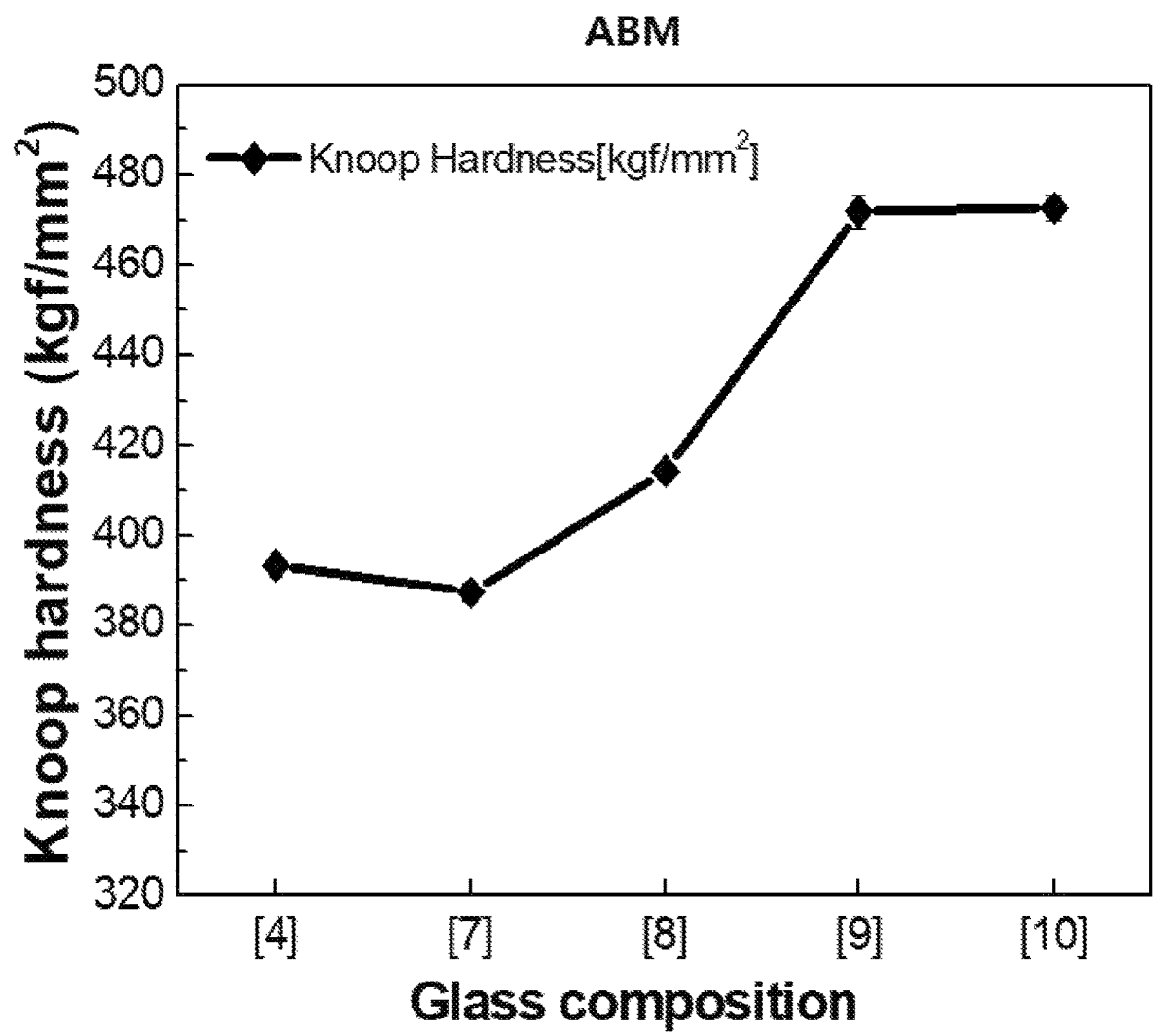
FIGS. 5A, 5B, and 5C are diagrams showing test results of mechanical property estimation according to glass composition design of $Al(PO_3)_3$—$BaF_2$—$(Sr, Ca, Mg)F_2$.
Figure 5B:
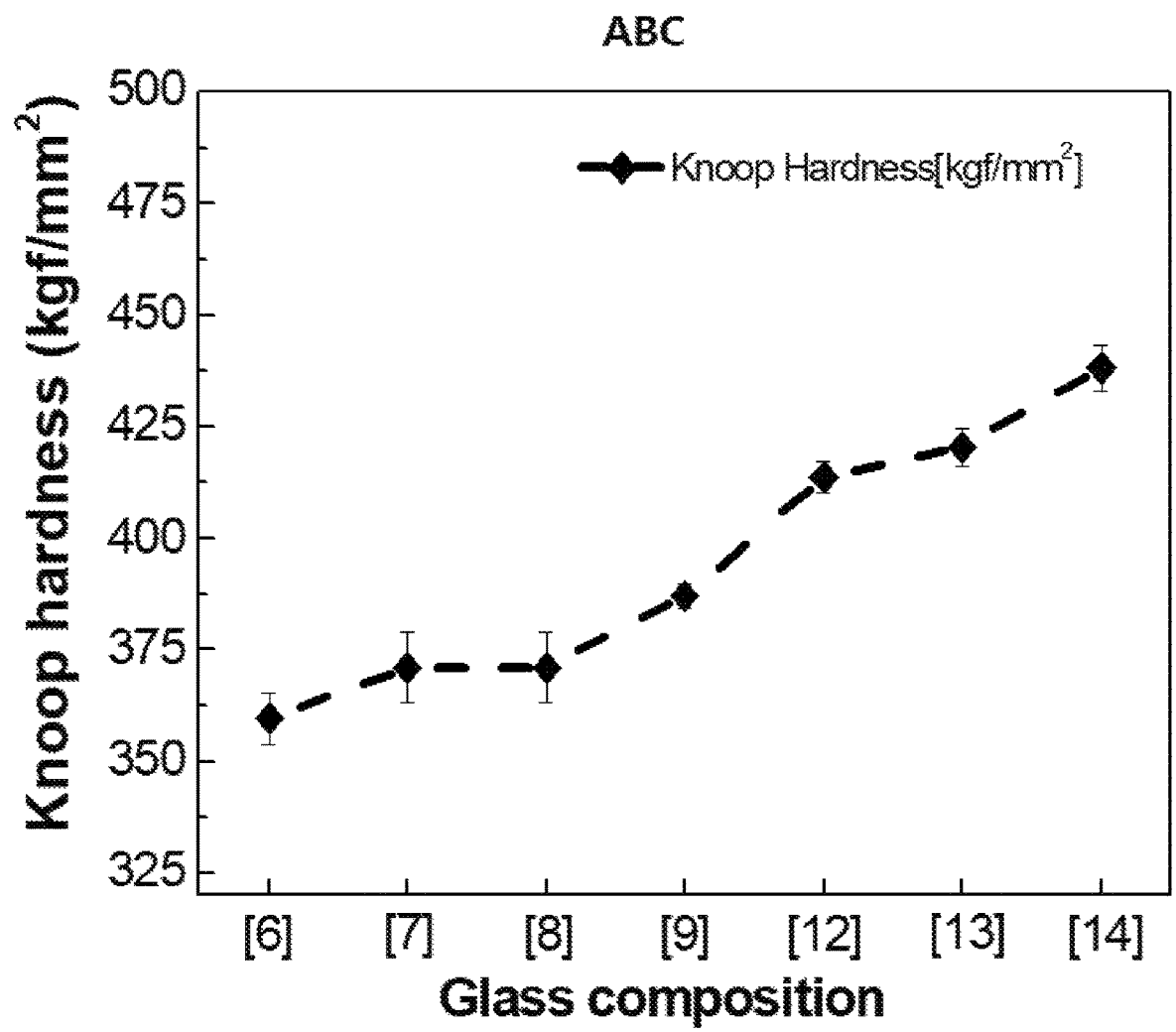
Figure 5C:
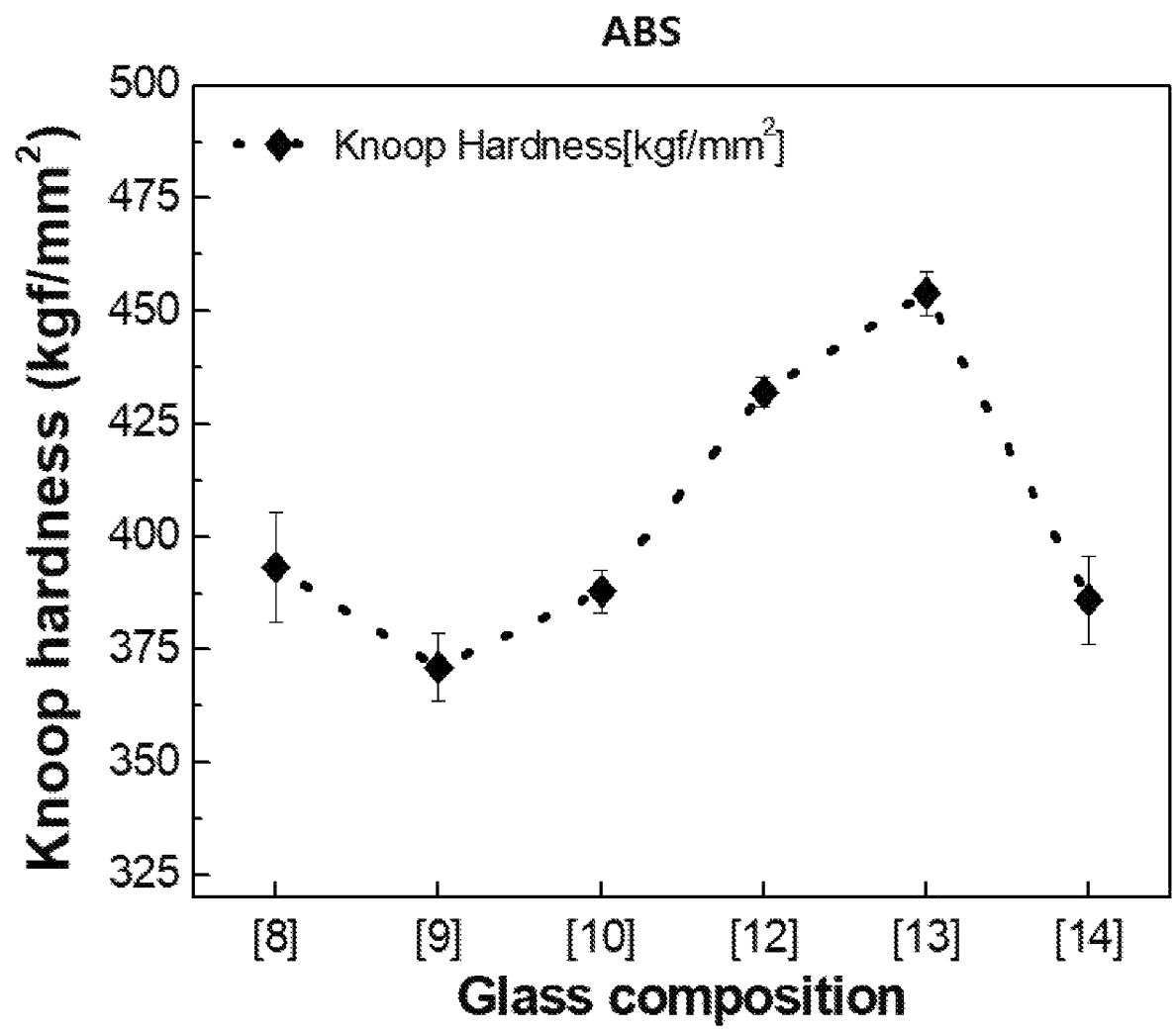
Figure 6A:
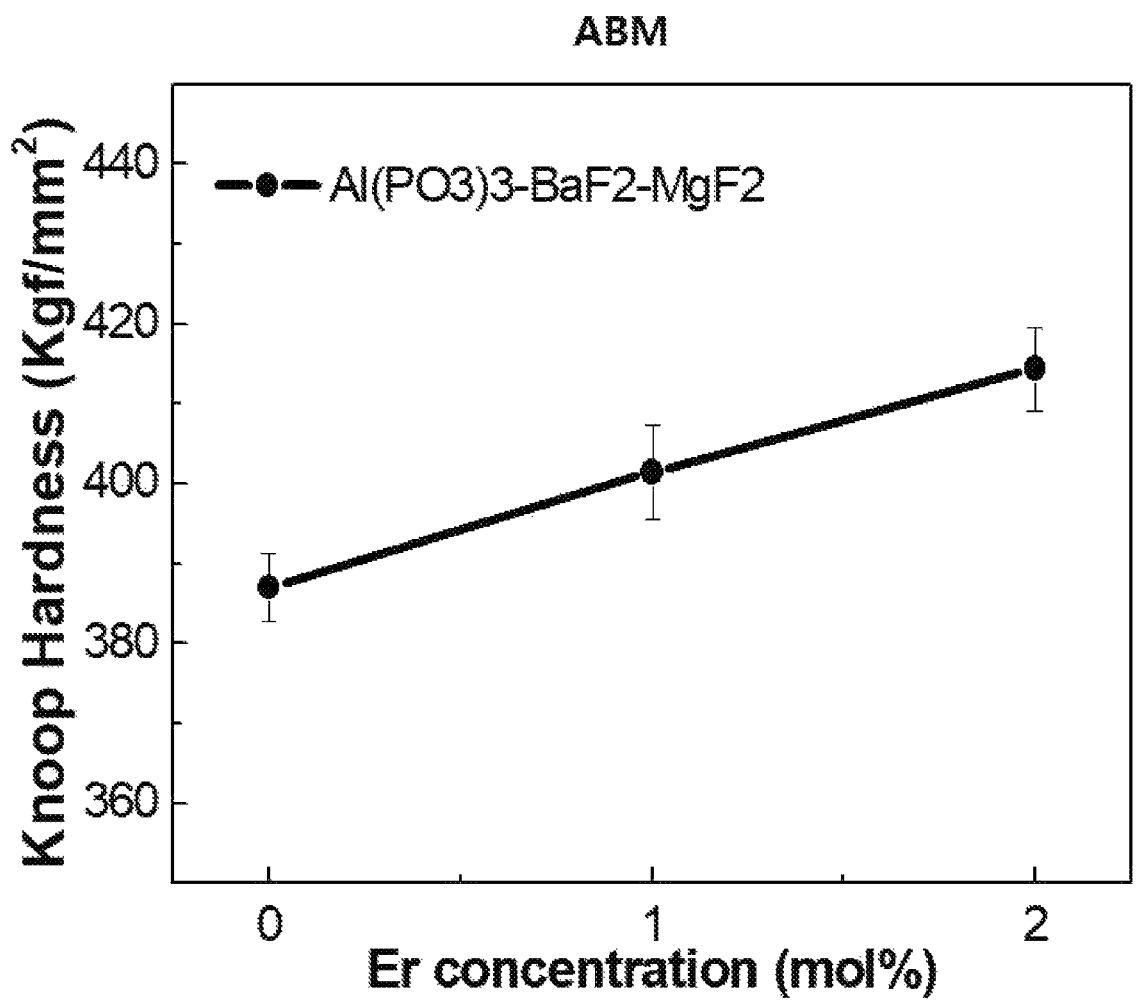
FIGS. 6A, 6B, and 6C are diagrams showing test results of mechanical property estimation according to glass composition design of $ErF_3$—$Al(PO_3)_3$—$BaF_2$—$(Sr, Ca, Mg)F_2$.
Figure 6B:
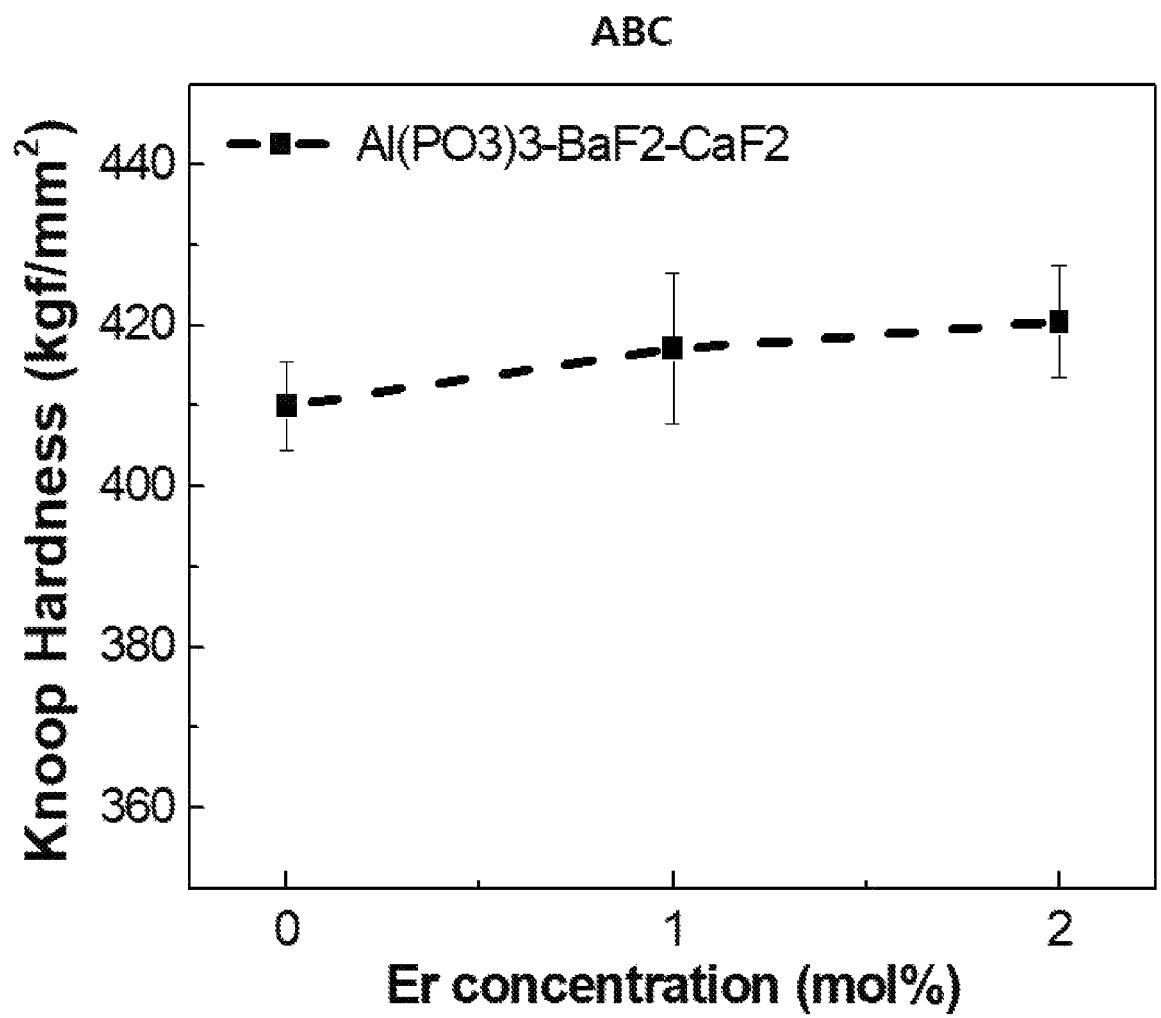
Figure 6C:
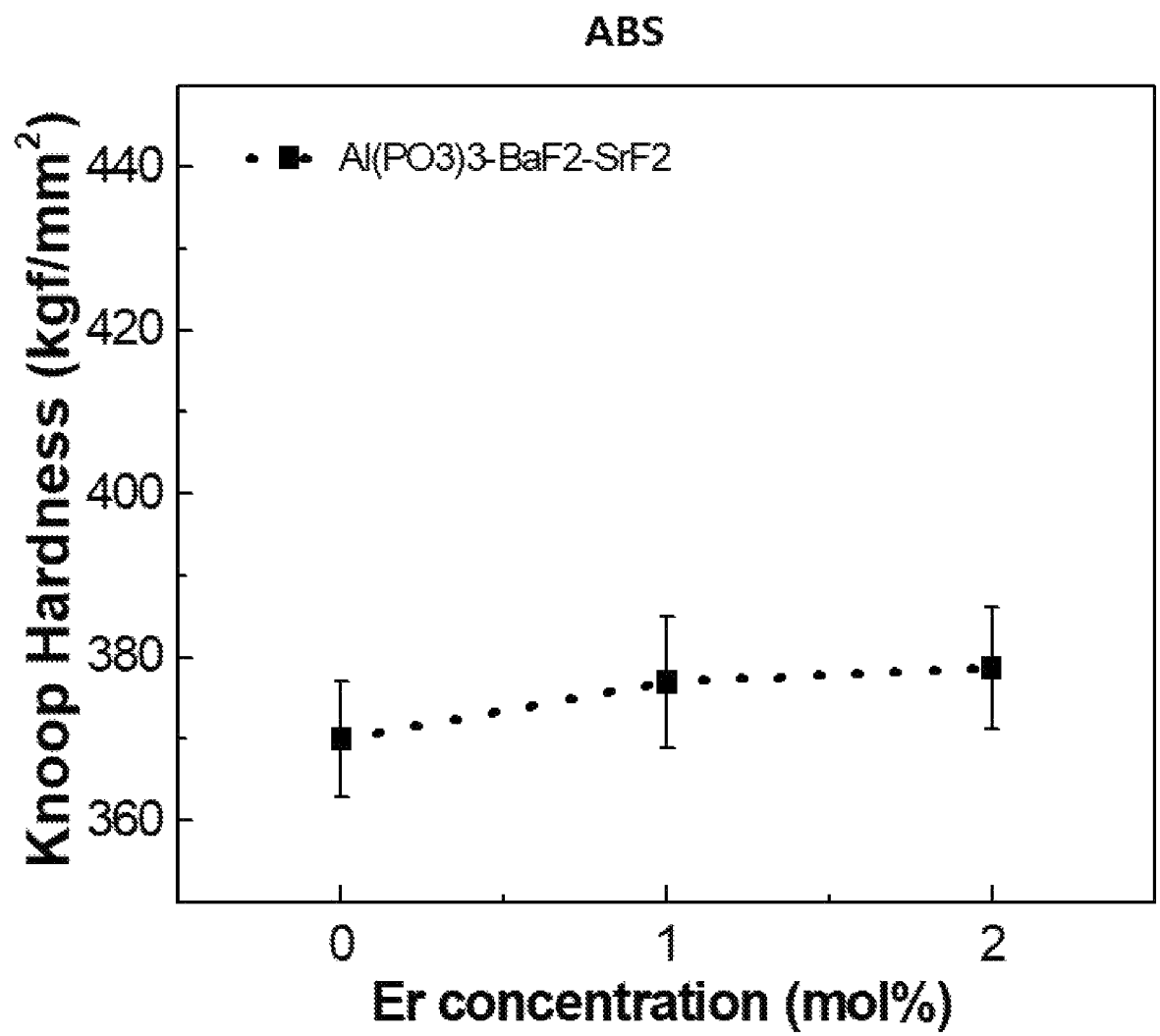

FIGS. 5A, 5B, and 5C are diagrams showing test results of mechanical property estimation according to glass composition design of $Al(PO_3)_3$—$BaF_2$—$(Sr, Ca, Mg)F_2$ and FIGS. 6A, 6B, and 6C are diagrams showing test results of mechanical properties according to glass composition design of $ErF_3$—$Al(PO_3)_3$—$BaF_2$—$(Sr, Ca, Mg)F_2$.

Referring to FIGS. 5A, 5B, and 5C, it can be seen that as the $BaF_2$ mol % decreases from 0.7 to 0.3, that is, $MgF_2$ mol % increases from 0.2 to 0.5 in $0.2Al(PO_3)_3$, the hardness of the $Al(PO_3)_3$—$BaF_2$—$MgF_2$-based glass linearly increases.

Meanwhile, the hardness is relatively low in the sample composition 4, which is determined because the composition ratio of $Al(PO_3)_3$ decreased to 0.1.

Accordingly, it can be seen that as the composition ratio of $Al(PO_3)_3$ increases in the $Al(PO_3)_3$—$BaF_2$—$MgF_2$-based glass, the hardness linearly increases.

Next, as for a hardness change of the $Al(PO_3)_3$—$BaF_2$—$CaF_2$-based glass, it can be seen that as $BaF_2$ mol % decreases from 0.7 to 0.4, that is, $CaF_2$ mol % increases from 0.1 to 0.4 in $0.2Al(PO_3)_3$, the hardness linearly increases and the same hardness increase is shown in $0.3Al(PO_3)_3$.

Further, when $Al(PO_3)_3$ increases, the hardness relatively increases, so it can be seen in this test that when the composition changes from the number 6 to the number 14, the hardness also linearly increases.

Next, as for a hardness change of $Al(PO_3)_3$—$BaF_2$—$SrF_2$-based glass, first, when the $BaF_2$ composition mole ratio is relatively large as 0.6 mol %, as in the composition samples 8 and 14, the hardness is very small.

In particular, it could be seen that there is little influence even though mol % of $Al(PO_3)_3$ increases in the $Al(PO_3)_3$—$BaF_2$—$SrF_2$-based glass.

Meanwhile, as $SrF_2$ mol % increases from 0.4 to 0.7, that is, from the composition 9 to composition 13 with $0.2Al(PO_3)_3$ fixed, the hardness linearly increases, which means that, according to the change tendency of hardness of Al(PO$_3$)$_3$—BaF$_2$—(Ca, Mg, Sr)F$_2$ fluorophosphate glass, the hardness is small in the region with a large composition ratio of BaF$_2$ and the hardness generally increases with an increase in CaF$_2$, MgF$_2$, or SrF$_2$ composition ratio to BaF$_2$. Further, an increase of phosphate with high melting temperature results in improvement of hardness.

Meanwhile, referring to FIGS. 6A, 6B, and 6C, it can be seen as (0.01, 0.02) mol % ErF$_3$ is added to Al(PO$_3$)$_3$—BaF$_2$—(Mg, Ca, Sr)F$_2$-based glass, Knoop hardness linearly increases.

When it is added up to 0.01 mol % ErF$_3$ concentration, as a test, it is expected that ligand and covalent bonding around Er ions increase, so, relatively, the glass transition temperature increases and hardness is improved when rare earth ions are relatively added even in consideration of non-uniform distribution of Er$^{3+}$ ions in glass crystals due to volatility.

Figure 7:
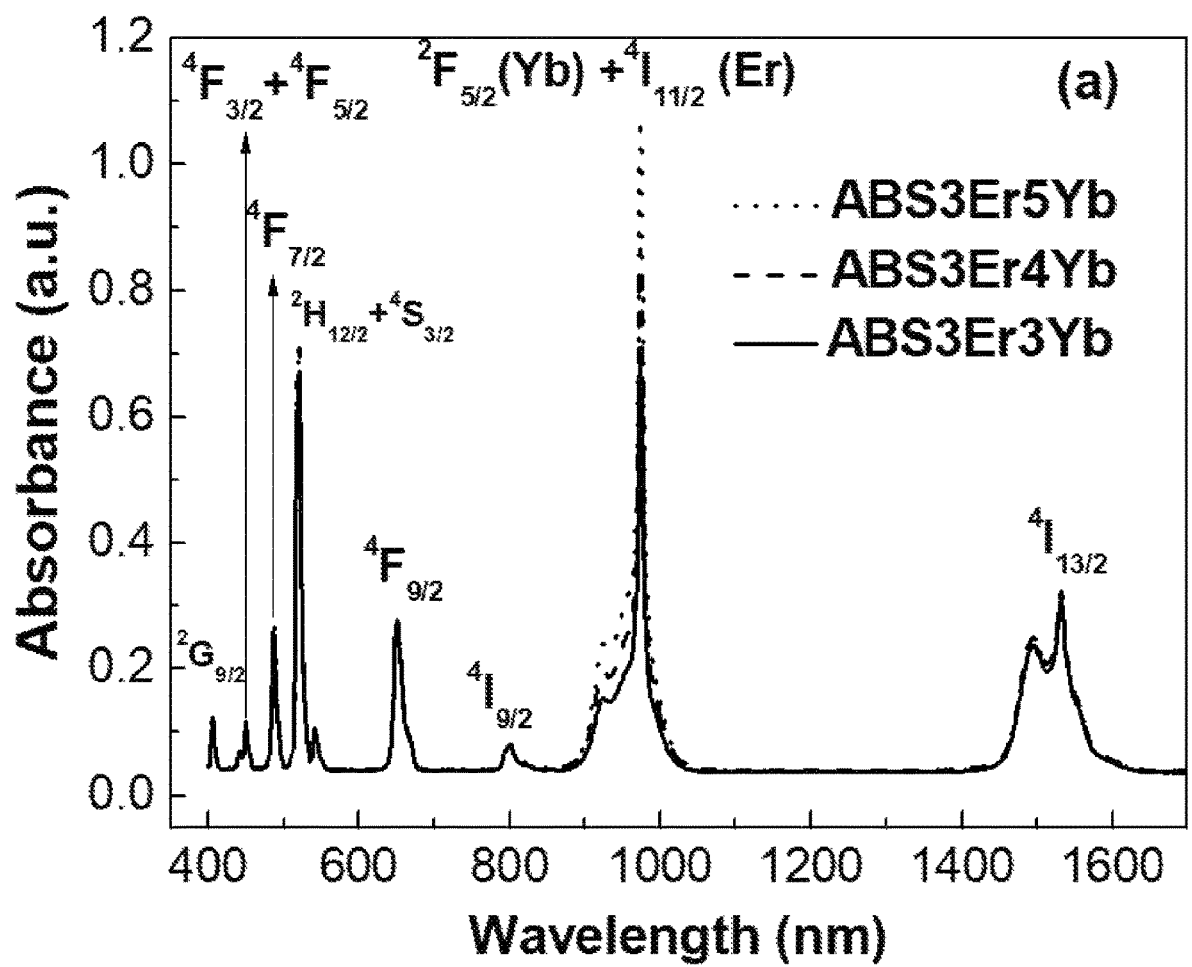
FIG. 7 is a diagram showing an absorption spectrum according to ytterbium (Yb) concentration of $Al(PO_3)_3$-(40-x)$BaF_2$—$SrF_2$-(0.03)$ErF_3$/(x)$YbF_3$-based glass (x=0.03: ASB3E3Y, 0.04:ASB3E4Y, 0.05:ASB3E5Y).

FIG. 7 is a diagram showing an absorption spectrum according to ytterbium (Yb) concentration of Al(PO$_3$)$_3$-(40-x)BaF$_2$—SrF$_2$-(0.03)ErF$_3$/(x)YbF$_3$-based glass (x=0.03: ASB3E3Y, 0.04:ASB3E4Y, 0.05:ASB3E5Y).

Referring to FIG. 7, as YbF$_3$ increases from 3 mol % to 5 mol %, transition intensity of $^2F_{7/2} \rightarrow 2F_{5/2}$ keeps increasing. The transition intensity of $^4I_{15/2} \rightarrow ^4I_{13/2}$ increases and then saturates, as YbF$_3$ increases. Further, the decreased intensity of $^4I_{13/2}$ and the energy level excited from the intensity show that there is an upconversion phenomenon.

Meanwhile, the absorption spectrum of FIG. 7 is applied to Judd-Ofelt Theory to calculate oscillation strengths, an intensity parameter, spontaneous emission probabilities, a branching ratio, and a radiative lifetime.

Figure 8:
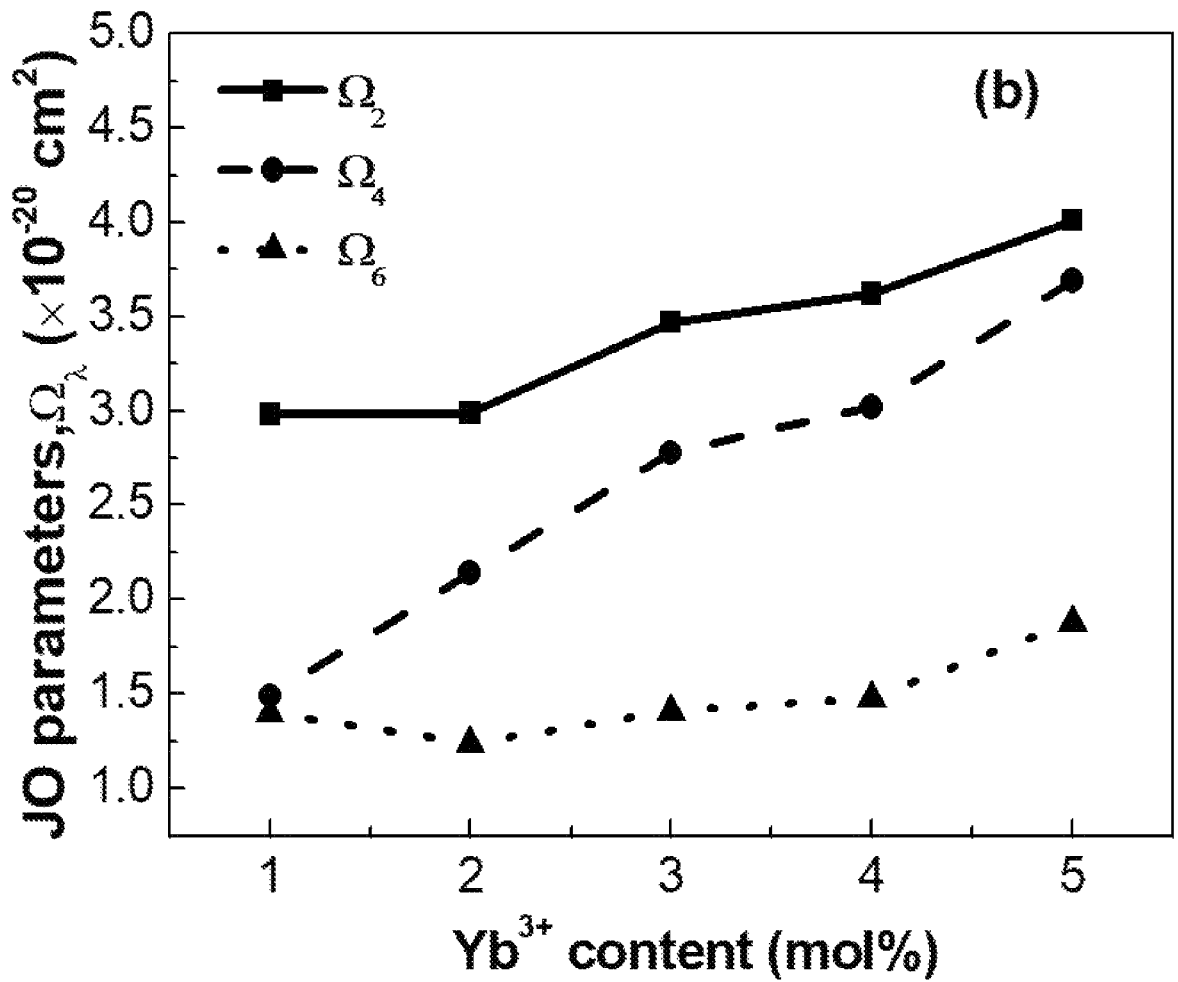
FIG. 8 is a diagram showing a change of Judd-Ofelt parameters according to ytterbium (Yb) concentration of $Al(PO_3)_3$-(40-x)$BaF_2$—$SrF_2$-(0.03)$ErF_3$/(x)$YbF_3$-based glass.

FIG. 8 is a diagram showing a Judd-Ofelt parameter change according to ytterbium (Yb) concentration of Al(PO$_3$)$_3$-(40-x)BaF$_2$—SrF$_2$-(0.03)ErF$_3$/(x)YbF$_3$-based glass (x=0.03:ASB3E3Y, 0.04:ASB3E4Y, 0.05:ASB3E5Y).

Referring to FIG. 8, it can be seen through Judd-Ofelt analysis that as YbF$_3$ increases, the Judd-Ofelt parameter $\Omega_\lambda$ keeps increasing. This means that as YbF$_3$ increases, the average symmetry of Er$^{3+}$ ions decreases and the covalency of Er—O bonding increases. Accordingly, a performance indicator that is about 2.04-time higher is obtained for X=0.05, as compared with the related art, so there is a high possibility of being able to be used as a laser gain medium for X=0.05.

Figure 9:
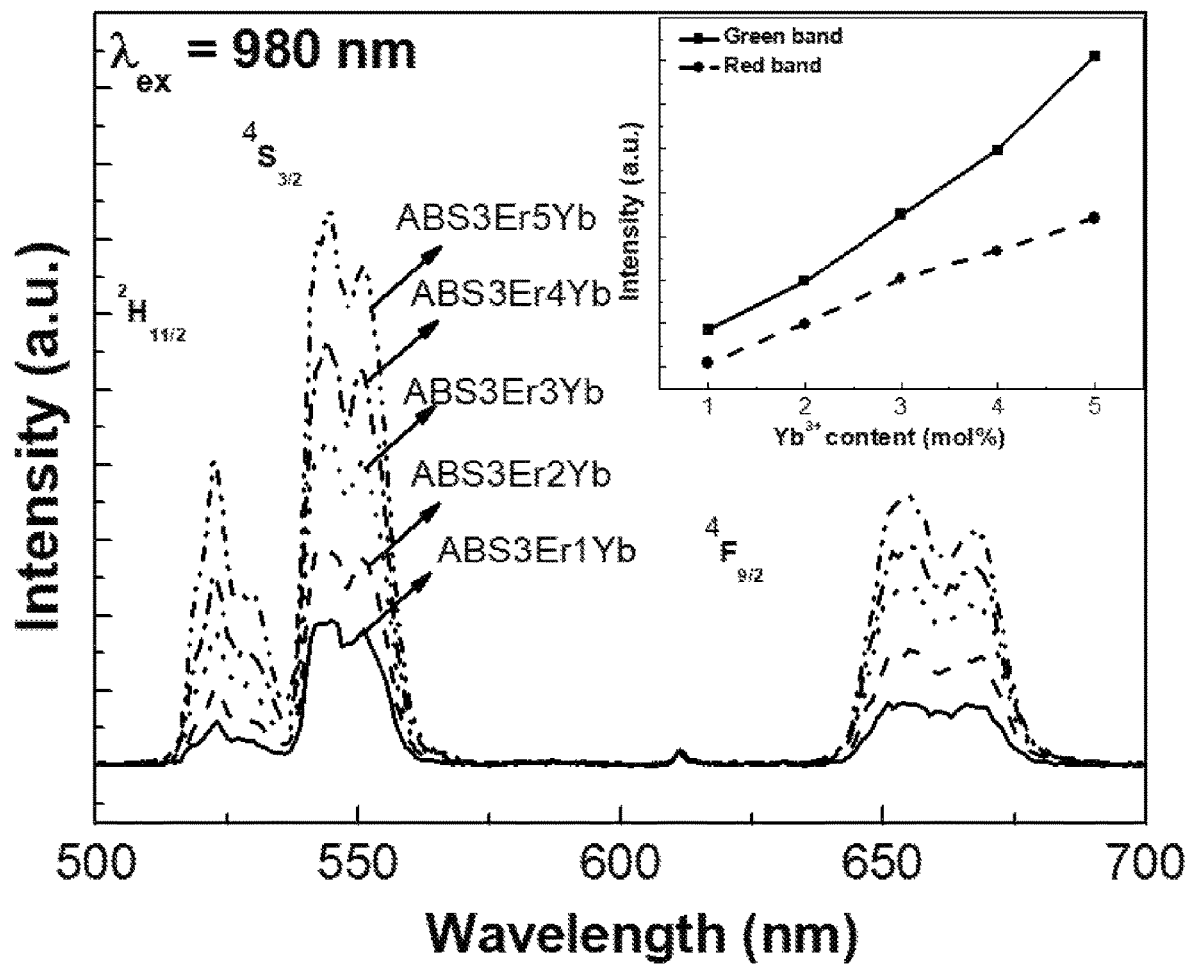
FIG. 9 is a diagram showing an upconversion spectrum according to ytterbium (Yb) concentration of $Al(PO_3)_3$-(40-x)$BaF_2$—$SrF_2$-(0.03)$ErF_3$/(x)$YbF_3$-based glass (x=0.01, 0.02, 0.03, 0.04, 0.05).

FIG. 9 is a diagram showing an upconversion spectrum according to ytterbium (Yb) concentration of Al(PO$_3$)$_3$-(40-x)BaF$_2$—SrF$_2$-(0.03)ErF$_3$/(x)YbF$_3$-based glass (x=0.01, 0.02, 0.03, 0.04, 0.05).

Referring to FIG. 9, two strong green emission peaks are shown 525 nm ($^2H_{11/2} \rightarrow ^4I_{15/2}$) and 545 nm ($^4S_{3/2} \rightarrow ^4I_{15/2}$) and one weak red emission peak is shown at 651 nm ($^4F_{9/2} \rightarrow ^4I_{15/2}$). That is, it can be seen that as the concentration of YbF$_3$ increases, the intensities of the green emission and the red emission monotonously increase.

Figure 10:
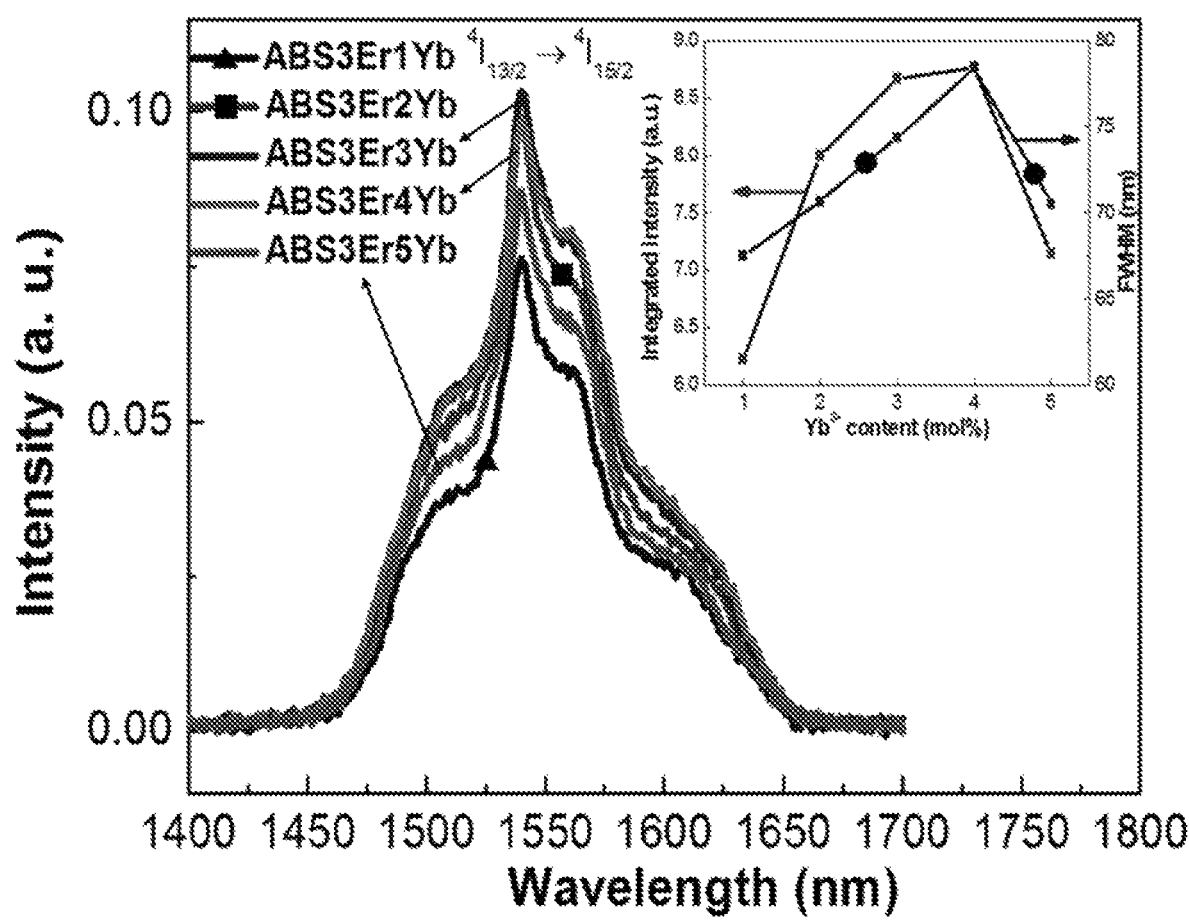
FIG. 10 is a diagram showing a near infrared ray emission spectrum according to ytterbium (Yb) concentration of $Al(PO_3)_3$-(40-x)$BaF_2$—$SrF_2$-(0.03)$ErF_3$/(x)$YbF_3$-based glass (x=0.01, 0.02, 0.03, 0.04, 0.05).

FIG. 10 is a diagram showing a near infrared ray emission spectrum according to ytterbium (Yb) concentration of Al(PO$_3$)$_3$-(40-x)BaF$_2$—SrF$_2$-(0.03)ErF$_3$/(x)YbF$_3$-based glass (x=0.01, 0.02, 0.03, 0.04, 0.05).

Referring to FIG. 10, it can be seen that an emission phenomenon of a wavelength of 1540 nm is a characteristic band of internal-4f conversion between $^4I_{15/2}$ and $^4I_{13/2}$ manifolds for excited Er$^{3+}$ ions having a wide band. That is, as YbF$_3$ increases from 1.0 mol % to 3.0 mol %, emission intensity of a wavelength of 1540 nm increases, so when the YbF$_3$ concentration increases over 3.0 mol %, the emission intensity of the wavelength of 1540 nm decreases.

Further, a full width at half maximum (FWHM) increases from 67 nm to 78 nm when YbF$_3$ increases from 1.0 mol % to 4.0 mol % and decreases when the YbF$_3$ concentration is 5.0 mol %. When the YbF$_3$ concentration is 5.0 mol %, the emission intensity and FWHM are decreased by a non-radiative process due to cluster formation.

Figure 11:
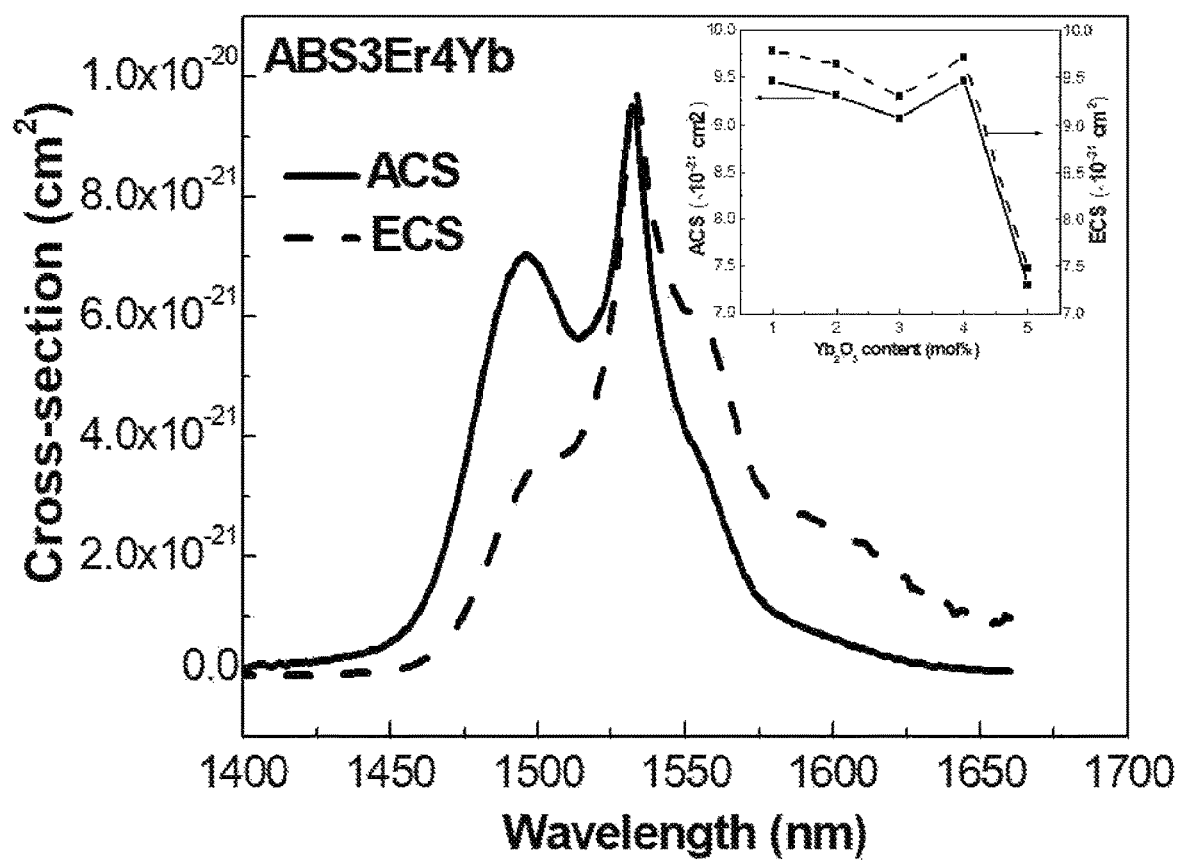
FIG. 11 is a diagram showing a test result of an absorption cross-section (ACS) and an emission cross-section (ECS) of $^4I_{13/2} \rightarrow {}^4I_{15/2}$ conversion according to the wavelength of $Al(PO_3)_3$—(40-x)$BaF_2$-$SrF_2$-(0.03)$ErF_3$/(x)$YbF_3$-based glass (x=0.04).

FIG. 11 is a diagram showing a test result of an absorption cross-section (ACS) and an emission cross-section (ECS) of $^4I_{13/2} \rightarrow ^4I_{15/2}$ conversion according to the wavelength of Al(PO$_3$)$_3$-(40-x)BaF$_2$—SrF$_2$-(0.03)ErF$_3$/(x)YbF$_3$-based glass (x=0.04).

Referring to FIG. 11, as the YbF$_3$ concentration increases, the absorption cross-section and the emission cross-section decrease. However, when YbF$_3$ is 4.0 mol %, the absorption cross-section and the emission cross-section increase due to an appropriate Er/Yb concentration ratio that may induce effective resonant energy transfer from Yb$^{3+}$ to Er$^{3+}$.

Figure 12:
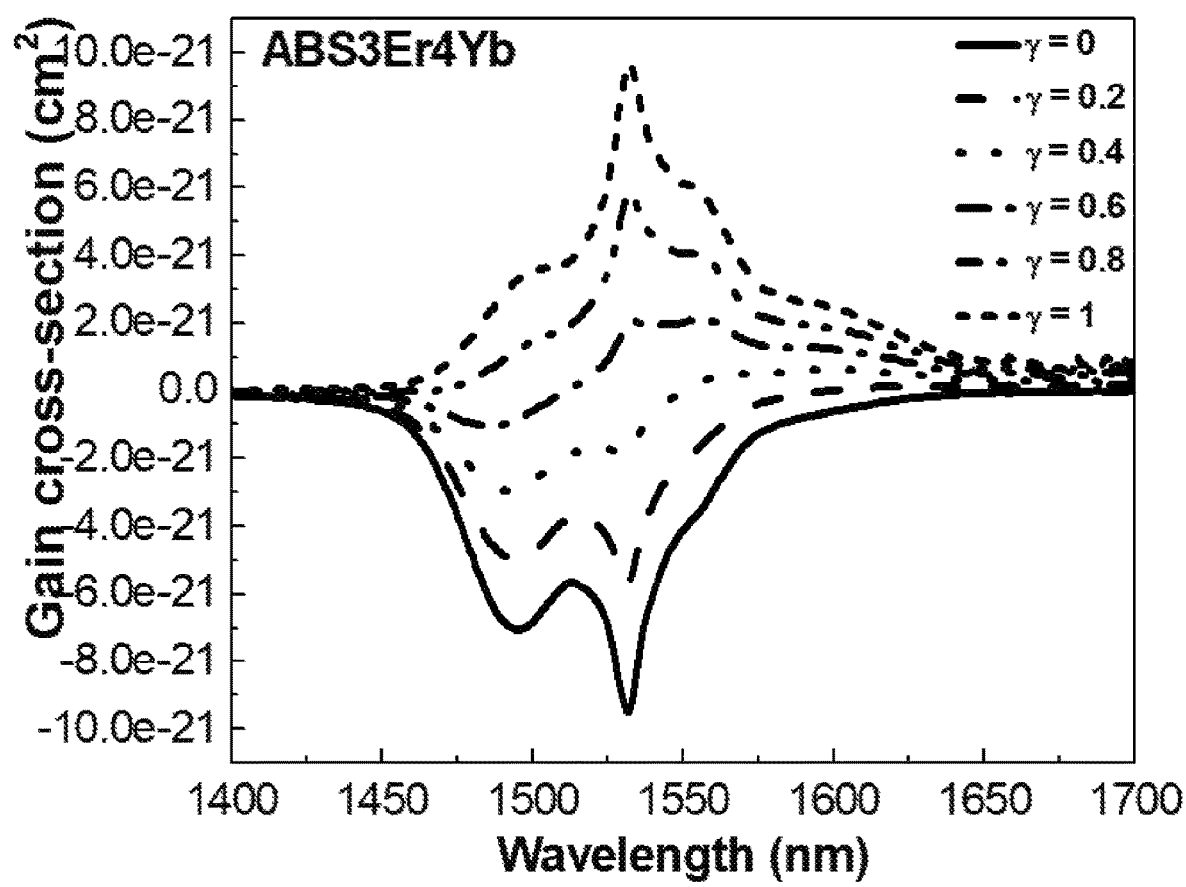
FIG. 12 is a diagram showing a test result of a gain constant change according to the wavelength and the population inversion ratio of $Al(PO_3)_3$-(40-x)$BaF_2$—$SrF_2$-(0.03)$ErF_3$/(x)$YbF_3$-based glass (x=0.04).

FIG. 12 is a diagram showing a test result of a gain constant change according to the wavelength and the population inversion ratio of Al(PO$_3$)$_3$-(40-x)BaF$_2$—SrF$_2$-(0.03)ErF$_3$/(x)YbF$_3$-based glass (x=0.04).

Referring to FIG. 12, it can be seen that when the population inversion ratio γ is 0.4 or more, the gain constant at 1540 nm may have a positive value. From this phenomenon, it can be seen that a low pump threshold value is required to laser operation of $^4I_{13/2} \rightarrow ^4I_{15/2}$ transition.

When the population inversion ratio γ is 0.4 or more, the laser emission wavelength moves to a short wavelength. Further, when the population inversion ratio γ is 0.4 or more, the bandwidth is 74 nm, which is very wide in comparison to the bandwidth of a common silicated erbium-doped fiber amplifier.

When population inversion ratio γ is 0.4 or more, a flat gain characteristic is shown in the range of 1490 nm to 1620 nm including C(1530-1565 nm) and L(1565-1625 nm) bands of an optical communication window. Accordingly, it is possible to receive more channels in wavelength division multiplex networks.

Figure 13:
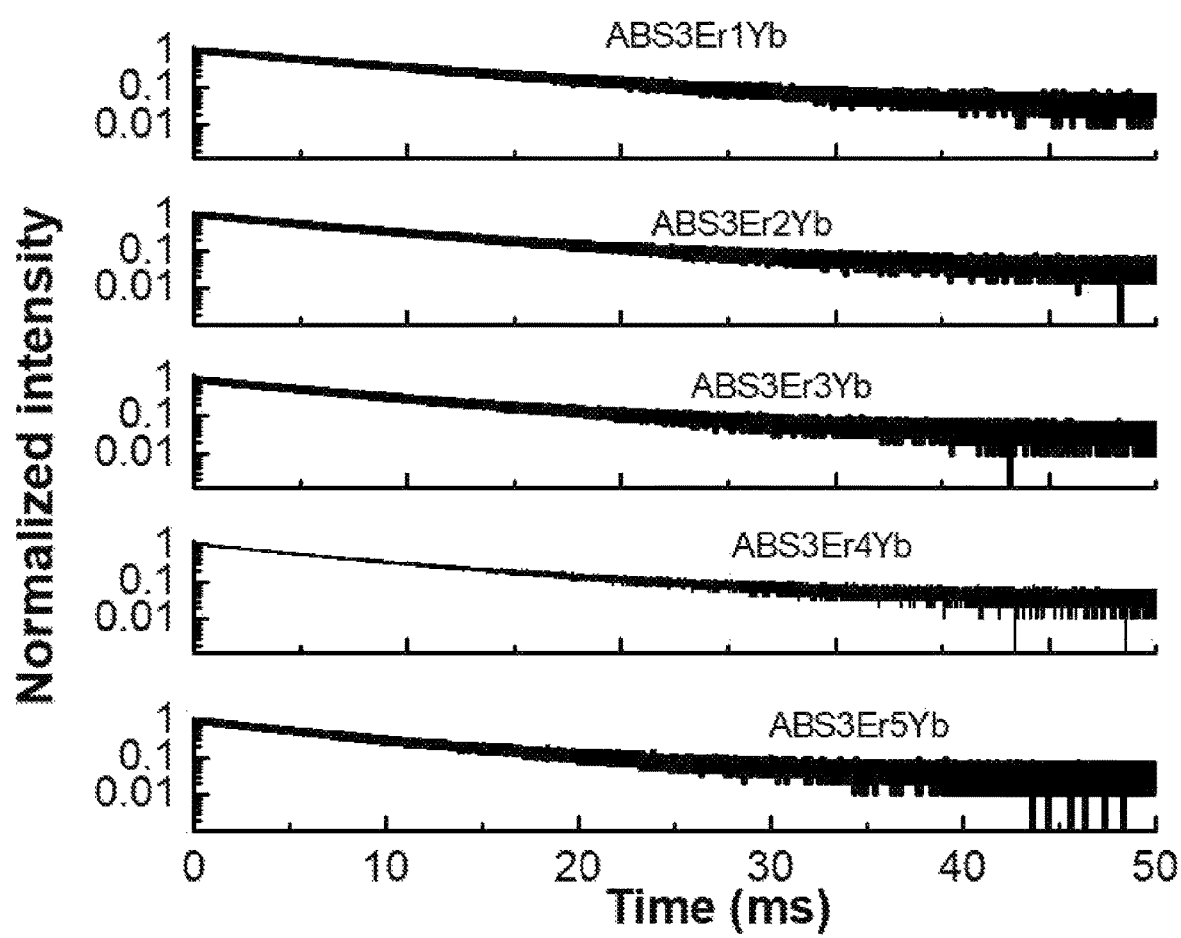
FIG. 13 is a diagram showing a carrier attenuation curve at an energy level of $^4I_{13/2}$ according to ytterbium (Yb) concentration of $Al(PO_3)_3$-(40-x)$BaF_2$—$SrF_2$-(0.03)$ErF_3$/(x)$YbF_3$-based glass (x=0.01, 0.02, 0.03, 0.04, 0.05).

FIG. 13 is a diagram showing a carrier attenuation curve at an energy level of $^4I_{13/2}$ according to ytterbium (Yb) concentration of Al(PO$_3$)$_3$-(40-x)BaF$_2$—SrF$_2$-(0.03)ErF$_3$/(x)YbF$_3$-based glass (x=0.01, 0.02, 0.03, 0.04, 0.05).

Referring to FIG. 13, when the concentration of YbF$_3$ increases from 1.0 mol % to 5.0 mol %, the carrier lifetime $\tau_{exp}$ at an energy level of $^4I_{13/2}$ is determined as 8.73, 11.85, 11.55, 12.37, and 10.47 ms. As the concentration of YbF$_3$ increases from 1.0 mol % to 4.0 mol %, $\tau_{exp}$ increases from 8.73 ms to 12.37 ms, and when concentration of YbF$_3$ increases to 5.0 mol %, $\tau_{exp}$ decreases to 10.47 ms.

The increase of $\tau_{exp}$ with an increase from 1.0 mol % to 4.0 mol % of the concentration of YbF$_3$ is because excitation through energy conversion according to the increase in concentration of YbF$_3$ and dispersion by ErF$_3$ increase. Further, the decrease of $\tau_{exp}$ due to the increase to 5.0 mol % of the concentration of YbF$_3$ is because a non-radiative loss is increased due to cluster formation. Accordingly, $\tau_{exp}$ when x is 0.02 to 0.05 in Al(PO$_3$)$_3$-(40-x)BaF$_2$—SrF$_2$-(0.03)ErF$_3$/(x)YbF$_3$ is longer than that of fluorophosphate glasses or fluorophosphate glasses based on Al(PO$_3$)$_3$ in the related art.

Next, an emission cross-section characteristic of fluorophosphate glasses for an active device according to the present embodiment is described.

Figure 14A:
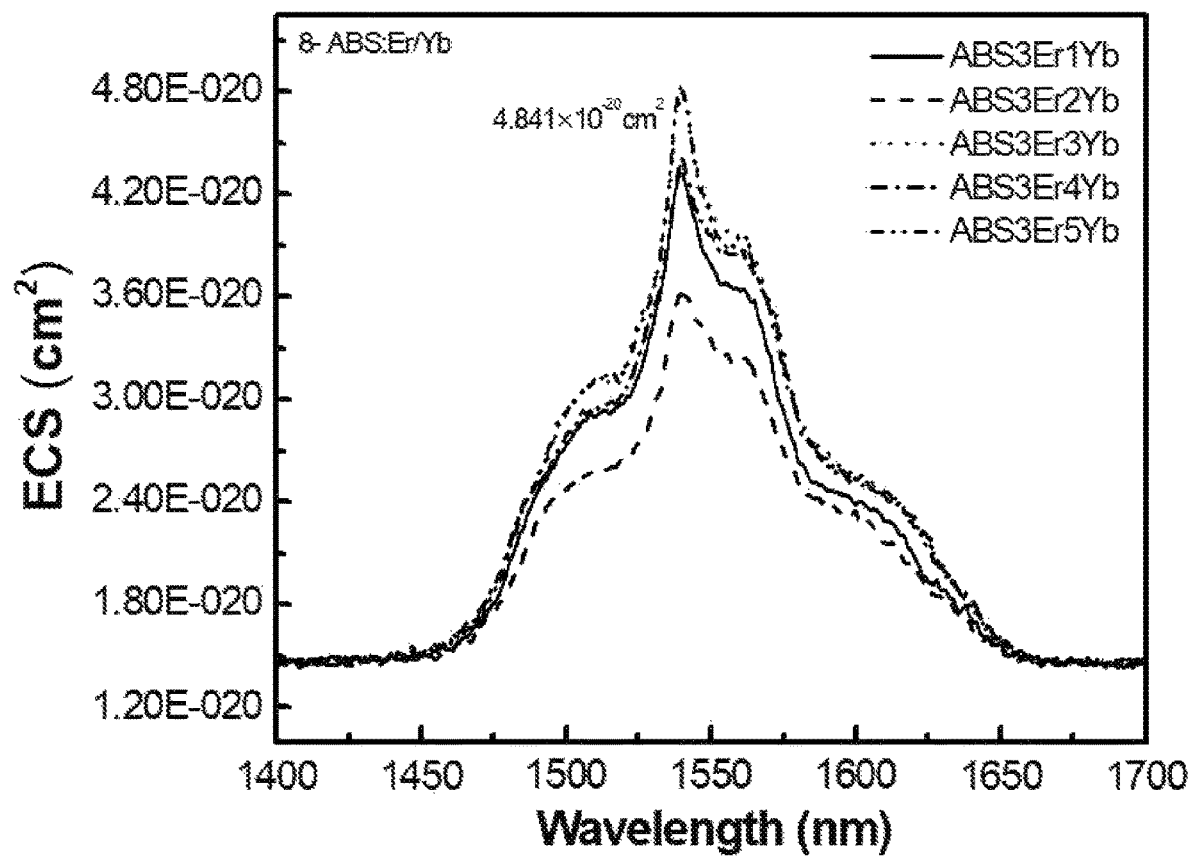
FIG. 14A is a diagram showing a test result of a carrier emission cross-section change according to ytterbium (Yb) concentration in a sample composition 8 of $Al(PO_3)_3$-(1-x)$BaF_2$—$SrF_2$-(0.03)$ErF_3$/(x)$YbF_3$-based glass (x=0.01, 0.02, 0.03, 0.04, 0.05).
Figure 14B:
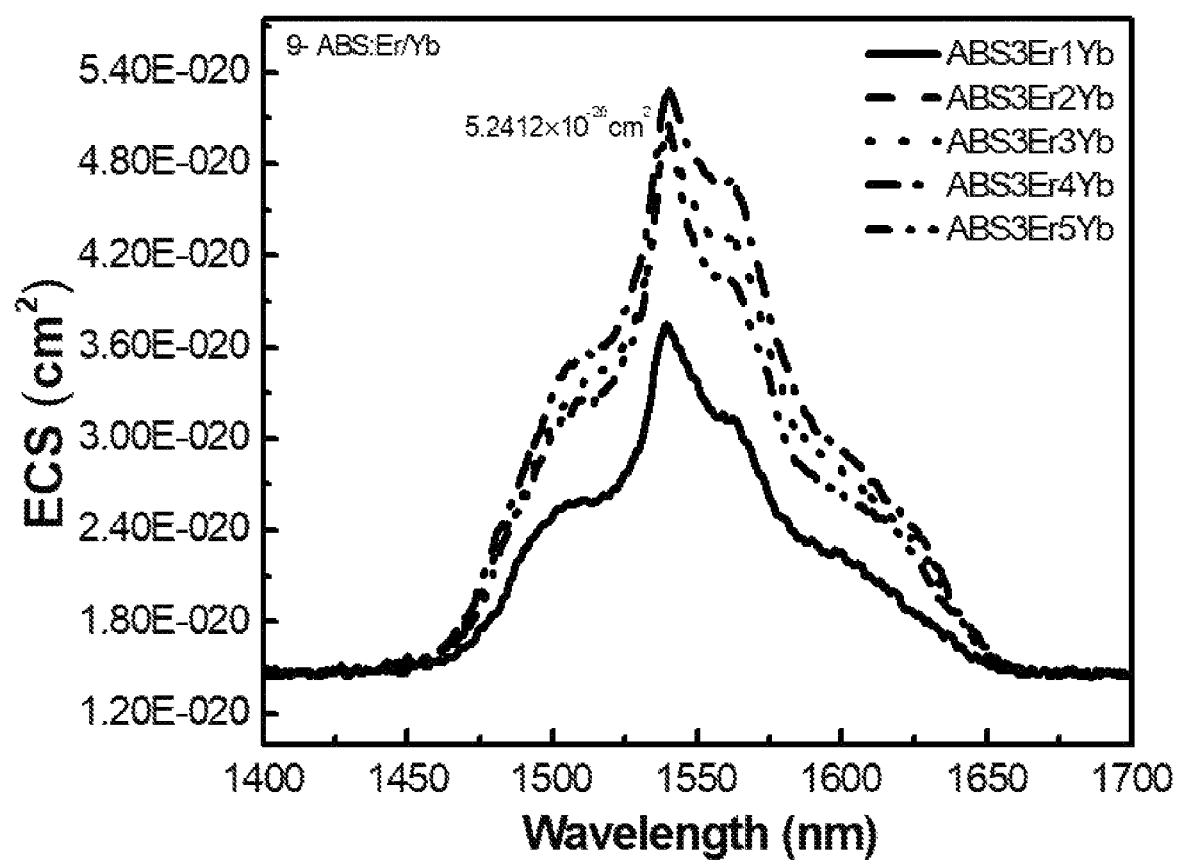
FIG. 14B is a diagram showing a test result on a carrier emission cross-section change according to ytterbium (Yb) concentration in a sample composition 9 of $Al(PO_3)_3$-(1-x)$BaF_2$—$SrF_2$-(0.03)$ErF_3$/(x)$YbF_3$-based glass (x=0.01, 0.02, 0.03, 0.04, 0.05).
Figure 14C:
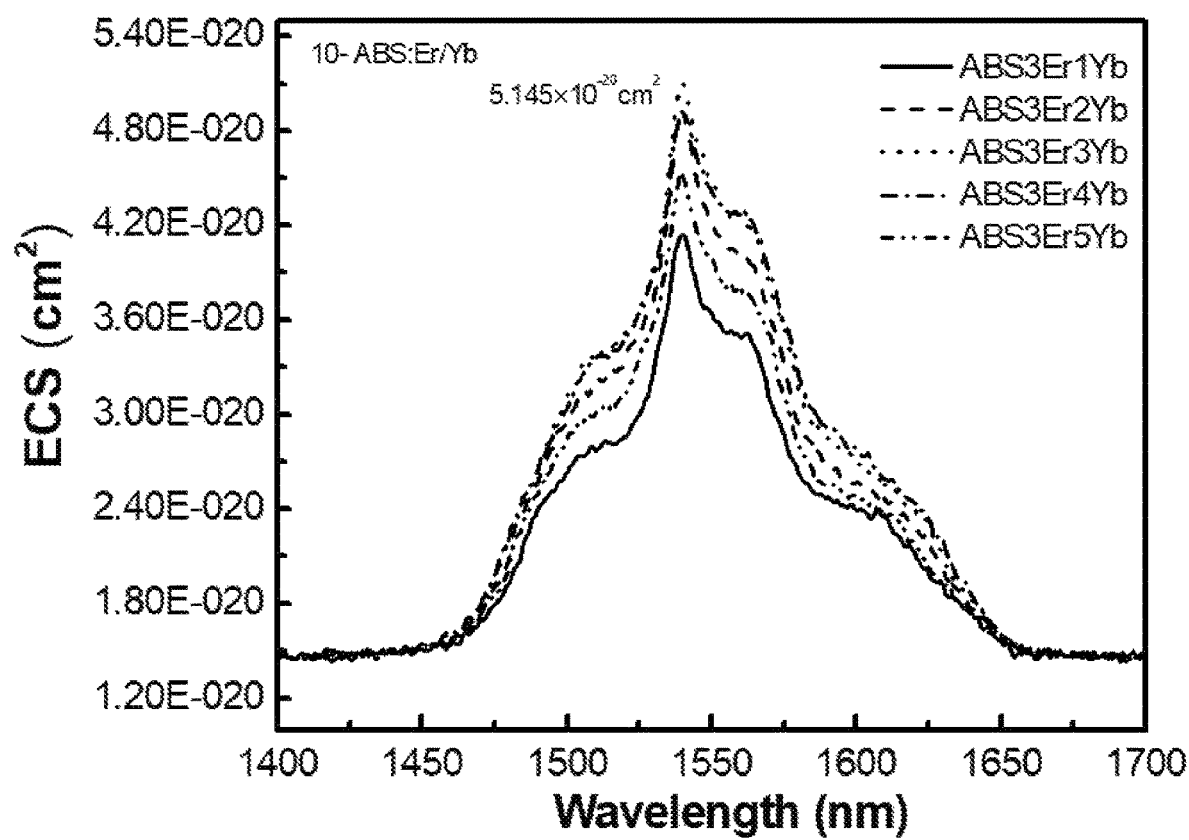
FIG. 14C is a diagram showing a test result on a carrier emission cross-section change according to ytterbium (Yb) concentration in a sample composition 10 of $Al(PO_3)_3$-(1-x)$BaF_2$—$SrF_2$-(0.03)$ErF_3$/(x)$YbF_3$-based glass (x=0.01, 0.02, 0.03, 0.04, 0.05).

FIGS. 14A to 14C are diagrams showing test results of a carrier emission cross-section change according to ytterbium (Yb) concentration in sample compositions 8, 9, and 10 of $Al(PO_3)_3$-(1-x)$BaF_2$—$SrF_2$-(0.03)$ErF_3$/(x)$YbF_3$-based glass (x=0.01, 0.02, 0.03, 0.04, 0.05).

Referring to FIG. 14A, it can be seen that the emission cross-section is the highest as $4.841 \times 10^{-21}$ cm$^2$ at (0.03)$ErF_3$/(0.05)$YbF_3$ for a triaxial composition 8 (referred to as 'ABS-8') of $Al(PO_3)_3$-(1-x)$BaF_2$—$SrF_2$-(0.03)$ErF_3$/(x)$YbF_3$-based glass (x=0.01, 0.02, 0.03, 0.04, 0.05).

Referring to FIG. 14B, it can be seen that the emission cross-section is the highest as $4.2412 \times 10^{-21}$ cm$^2$ at (0.03)$ErF_3$/(0.04)$YbF_3$ for a triaxial composition 9 (referred to as 'ABS-9') of $Al(PO_3)_3$-(1-x)$BaF_2$—$SrF_2$-(0.03)$ErF_3$/(x)$YbF_3$-based glass (x=0.01, 0.02, 0.03, 0.04, 0.05).

Referring to FIG. 14C, it can be seen that the emission cross-section is the highest as $4.145 \times 10^{-21}$ cm$^2$ at (0.03)$ErF_3$/(0.03)$YbF_3$ for a triaxial composition 10 (referred to as 'ABS-10') of $Al(PO_3)_3$-(1-x)$BaF_2$—$SrF_2$-(0.03)$ErF_3$/(x)$YbF_3$-based glass (x=0.01, 0.02, 0.03, 0.04, 0.05).

In other words, these results are considered as being caused by a relatively small ratio of quenching effect, such as energy transition and multiphonon relaxation of rare earth elements.

Further, when the content of $SrF_2$ increases instead of $BaF_2$ with a composition change of a base material, that is, the sample composition increases from sample composition ABS-8 to sample composition ABS-10, the relatively highest emission cross-section is shown at the ratio of $ErF_3$:$YbF_3$=0.03:0.03 to 0.03:0.05, so a high emission cross-section may be achieved at a relatively very lower content of $YbF_3$ than 1:3 that is the ratio studied up to now.

Figure 15A:
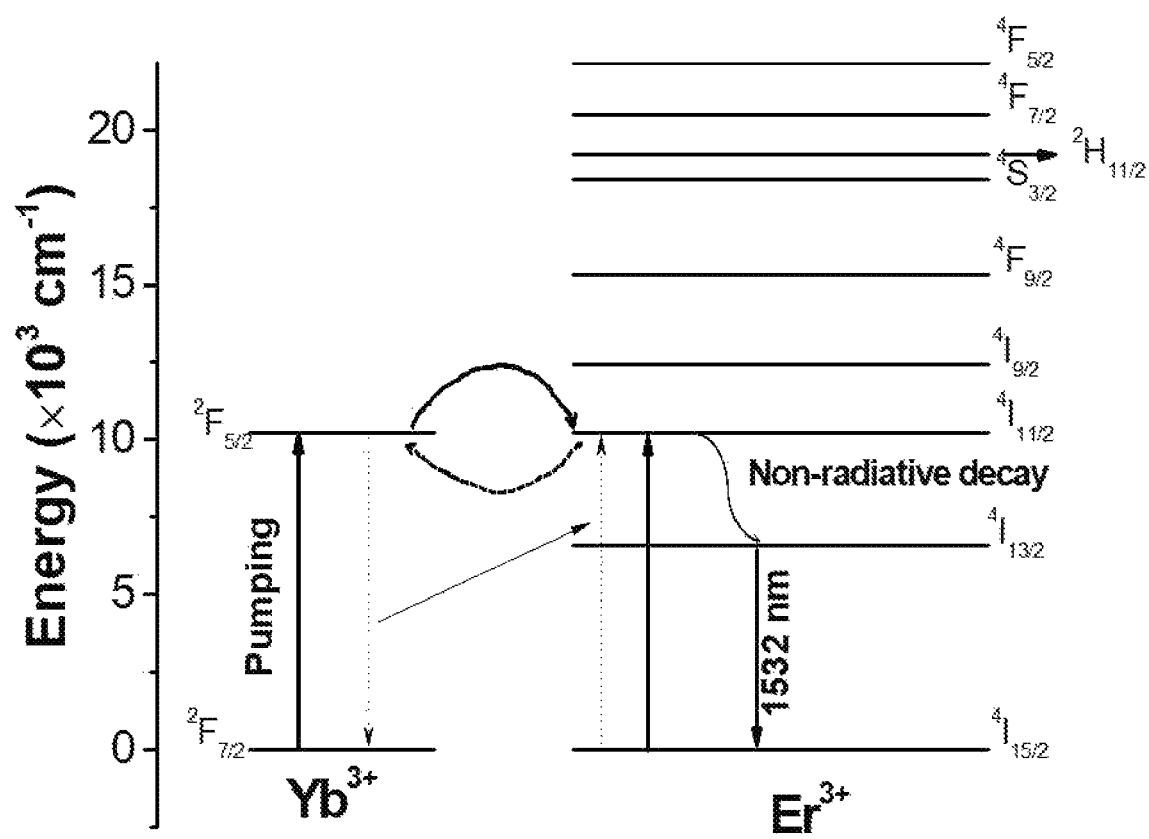
FIG. 15A is an energy level diagram illustrating a photon emission phenomenon according to absorption and downconversion of photons in an Er/Yb system.
Figure 15B:
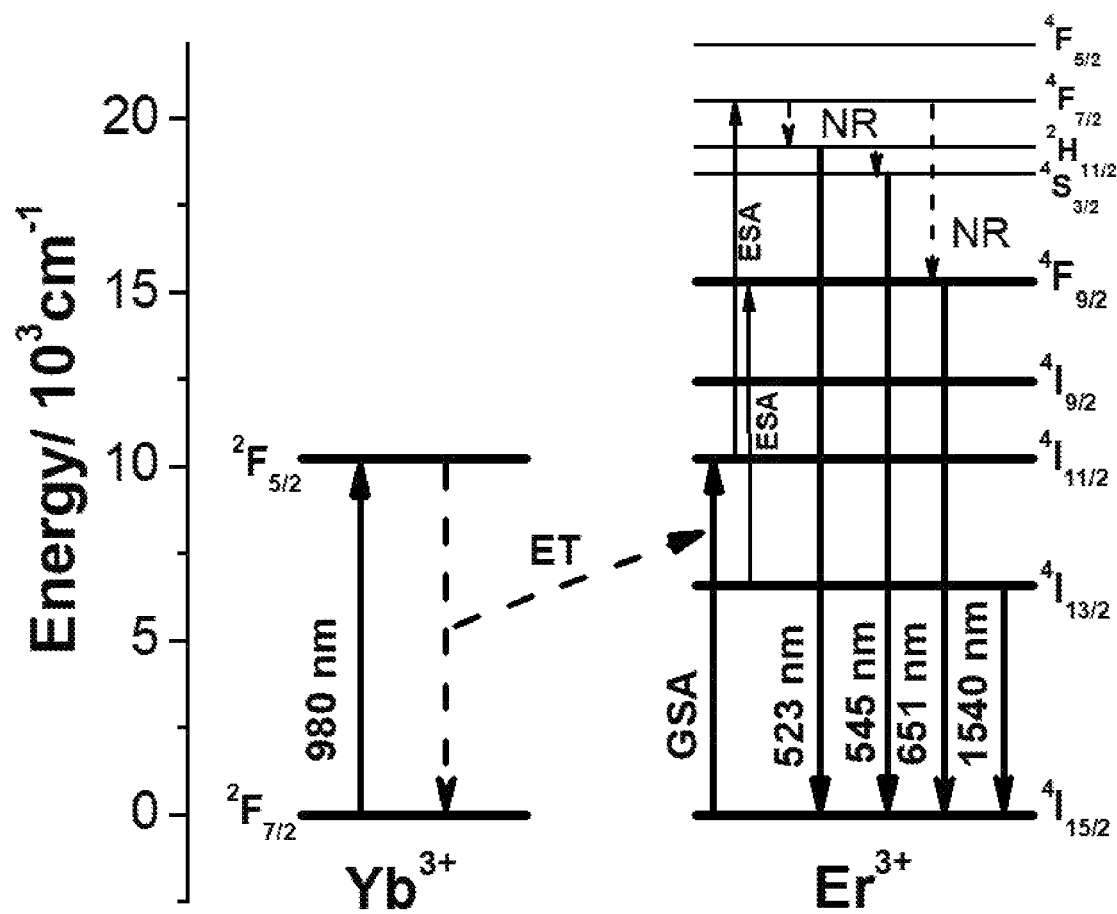
FIG. 15B is an energy level diagram illustrating a photon emission phenomenon according to absorption and upconversion of photons in an Er/Yb system.

FIG. 15A is an energy level diagram illustrating a photon emission phenomenon according to absorption and down-conversion of photons in an Er/Yb system and FIG. 15B is an energy level diagram illustrating a photon emission phenomenon according to absorption and upconversion of photons in an Er/Yb system.

Downconversion is described first with reference to FIG. 15A. It can be seen that when Er/Yb are co-doped, operation is performed through three laser energy levels (three level laser).

In this case, it can be seen that an energy transition phenomenon occurs between $^4I_{15/2}{^4I_{11/2}}$ transition of erbium (Er) and $^2F_{7/2}{^2F_{5/2}}$ transition of ytterbium (Yb) and a non-radiative transmission phenomenon to $^4I_{11/2}{^4I_{13/2}}$ of erbium (Er) is complexly shown, thereby influencing the carrier lifetime at $^4I_{13/2}$.

When the concentration of ytterbium (Yb) increases, $^2F_{7/2}{^2F_{5/2}}$ transition of ytterbium (Yb) and $^4I_{15/2}{^4I_{11/2}}$ transition of erbium (Er) overlap, so an energy transfer phenomenon from ytterbium (Yb) to erbium (Er) increases. Further, as described above, the effect of ytterbium (Yb) ions reducing the non-radiative process of the erbium (Er) ions increases, so the carrier lifetime at the energy level of $^4I_{13/2}$ increases.

Next, upconversion is described.

Upconversion occurs in very (imitative situations and is almost not observed in the natural world.

The upconversion phenomenon is a phenomenon of excitation to an energy level higher than the energy of one photon due to not a single photon, but two or more photons. This is also called anti-Stokes-emission.

According to the upconversion phenomenon, an electron primarily is excited to a high energy level by absorbing a photon and then it should absorb another photon before dropping to the ground state. Accordingly, the electron primarily excited by absorbing a photon should exist at the primarily excited energy level until it secondarily absorbs a photon.

Referring to FIG. 15B, as described above, some of carriers excited to $^4I_{11/2}$ through energy transition of $^4I_{15/2} \to 2\ ^4I_{11/2}$ move to $^4I_{13/2}$ through non-radiative re-bonding and then move to $^4I_{15/2}$ through radiative re-bonding.

Another carrier remaining at $^4I_{11/2}$ is up-converted by an exited-state absorption phenomenon of excitation to $^4F_{7/2}$ or $^4F_{9/2}$ by another energy transfer of $^4I_{15/2} \to ^4I_{11/2}$.

The carriers up-converted to $^4F_{7/2}$ or $^4F_{9/2}$ drop to $^2H_{11/2}$, $^4S_{3/2}$, and $^4F_{9/2}$ through non-radiative re-bonding. The carriers dropped to $^2H_{11/2}$, $^4S_{3/2}$, and $^4F_{9/2}$ drop again to $^4I_{15/2}$ and re-bonding, thereby emitting photons of 523 nm and 545 nm and a photon of 651 nm.

Figure 16:
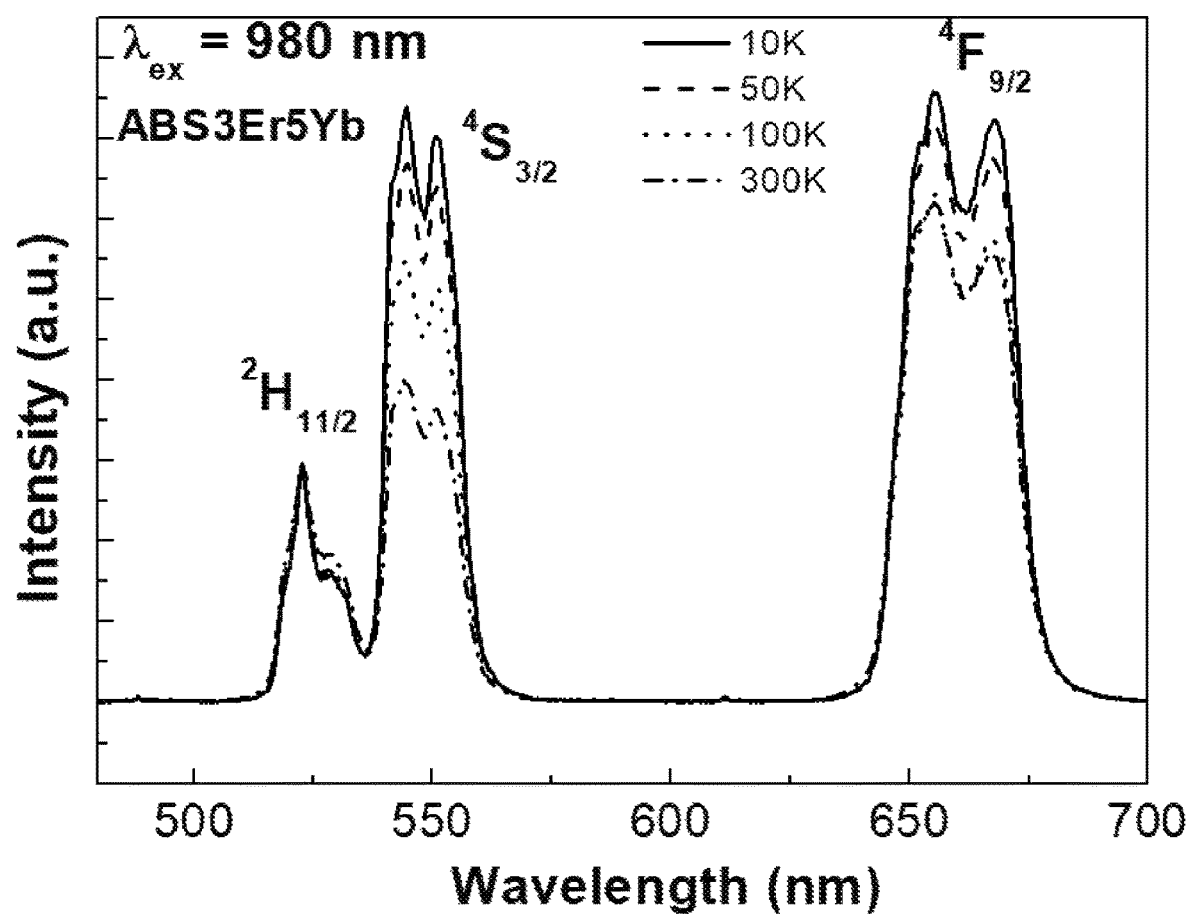
FIG. 16 is a diagram illustrating a low-temperature upconversion emission spectrum of $Al(PO_3)_3$-(1-x)$BaF_2$—$SrF_2$-(0.03)$ErF_3$/(x)$YbF_3$-based glass (x=0.05).

FIG. 16 is a diagram illustrating a low-temperature upconversion emission spectrum of $Al(PO_3)_3$-(1-x)$BaF_2$—$SrF_2$-(0.03)$ErF_3$/(x)$YbF_3$-based glass (x=0.05).

Referring to FIG. 16, a non-radiative attenuation ratio increases with an increase of temperature, so luminescence intensity decreases in a measured entire wavelength region. However, intensity at a band of 521 nm ($^2H_{11/2} \to ^4I_{15/2}$) increases. This phenomenon is because the $YbF_3$ ratio and concentration increase due to thermal excitation of carriers from a level of $^4S_{3/2}$ to a level of $^2H_{11/2}$.

Accordingly, it can be seen that it is possible to analyze influence of temperature on thermally coupled levels of $Al(PO_3)_3$-(1-x)$BaF_2$—$SrF_2$-(0.03)$ErF_3$/(x)$YbF_3$-based glass through a fluorescence temperature sensing method.

Figure 17A:
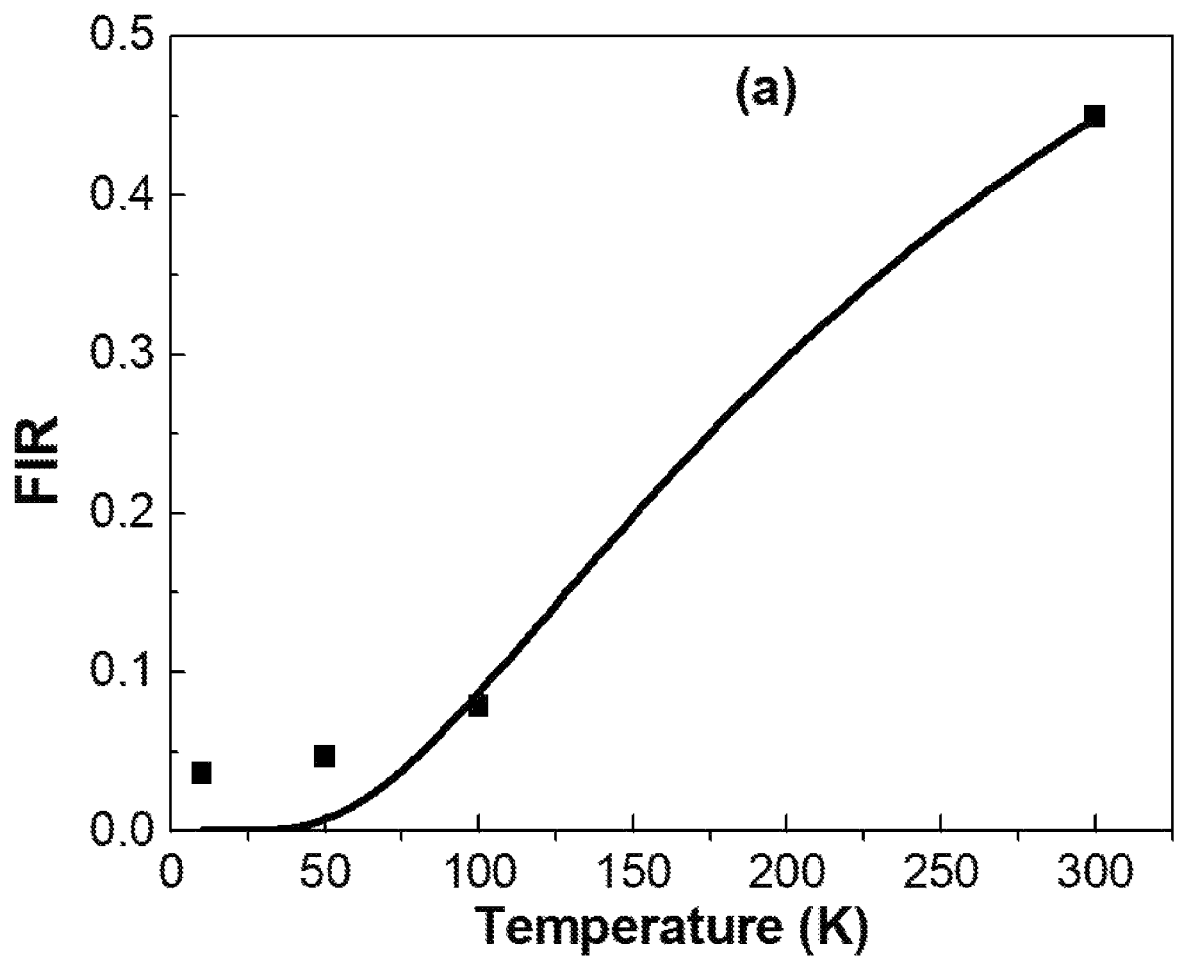
FIG. 17A is a diagram illustrating a fluorescence intensity ratio (FIB) of green emissions of $Al(PO_3)_3$-(1-x)$BaF_2$—$SrF_2$-(0.03)$ErF_3$/(x)$YbF_3$-based glass (x=0.05).
Figure 17B:
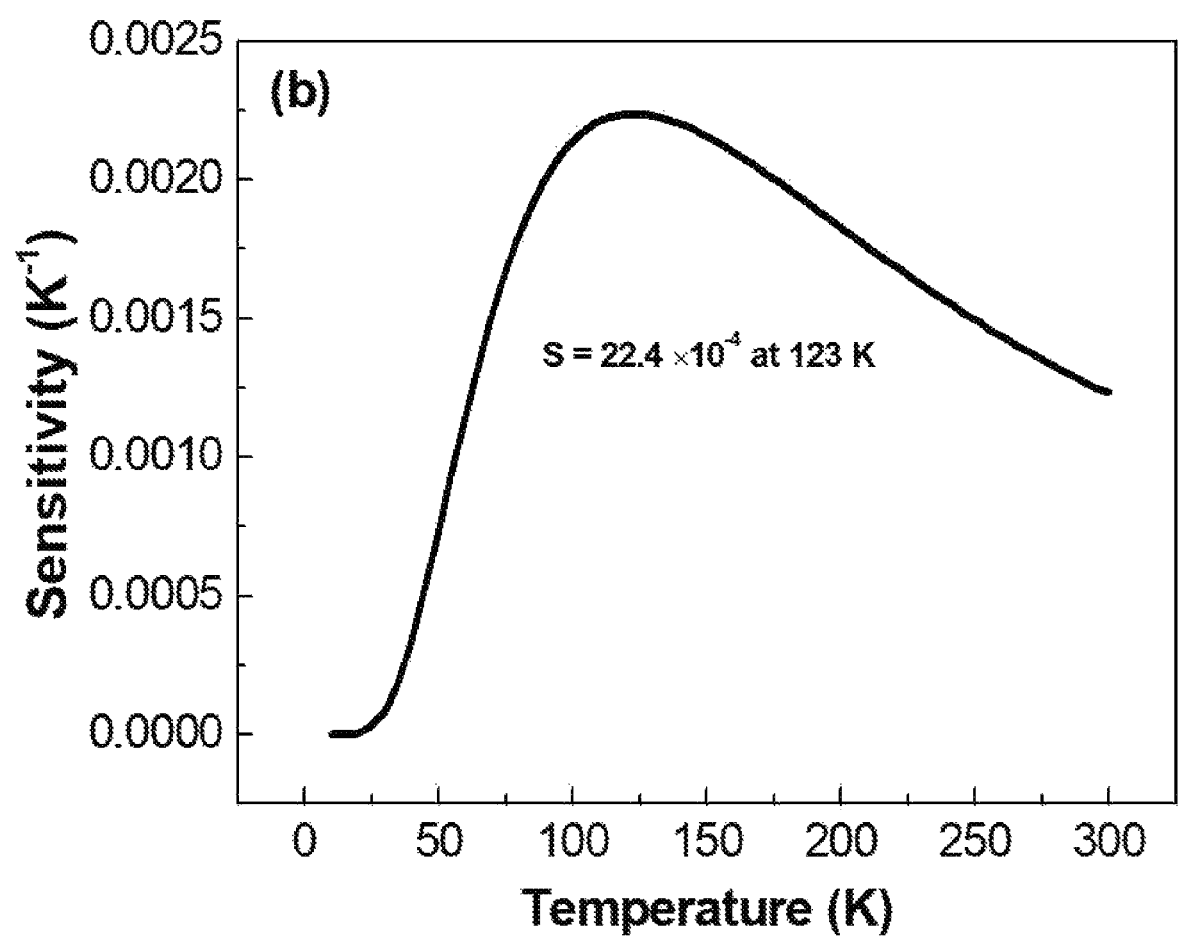
FIG. 17B is a diagram illustrating a change according to temperature of sensitivity S of glass of FIG. 17A.

FIG. 17A is a diagram illustrating a fluorescence intensity ratio (FIB) of green emissions of $Al(PO_3)_3$-(1-x)$BaF_2$—$SrF_2$-(0.03)$ErF_3$/(x)$YbF_3$-based glass (x=0.05) and FIG. 17B is a diagram illustrating a change according to temperature of sensitivity S.

The sensitivity S is a rate according to time of fluorescence intensity ratio (FIR, hereafter, referred to as R).

Referring to FIG. 17A, it can be seen that, fluorophosphate glasses for an active device according to the present embodiment, the degree of change of the fluorescence intensity ratio (FIR) can be decomposed in accordance with temperature even at cryogenic temperature (e.g., 100 K or less).

Accordingly, as it can be seen from FIG. 17B, high sensitivity S is shown at cryogenic temperature.

S and maximum sensor sensitivity Tmax calculated on the basis of FIGS. 17A to 17B are shown in Table 1.

Referring to Table 1, the fluorophosphate glasses for an active device according to the present embodiment (particularly, $Al(PO_3)_3$-(1-x)$BaF_2$—$SrF_2$-(0.03)$ErF_3$/(x)$YbF_3$ glass (x=0.05)) have S of $22.4 \times 10^{-4}$ and $T_{max}$ of 123 K.

Accordingly, it can be seen that the fluorophosphate glasses for an active device according to the present embodiment have high sensitivity S at cryogenic temperature (123 K) that has not been shown in any glass base materials.

TABLE 1

| Glass host | Dopant | S | $T_{max}$ | T | $\lambda_{ex}$ |
|---|---|---|---|---|---|
| Fluorophosphate | Er/Yb | 22 | 123 | 10-300 | 980 |
| Tellurite-zinc-niobium | Er/Yb | 95 | 363 | 276-363 | 980 |
| Zinc fluorophosphate | Er | 79 | 630 | 298-773 | 488 |
| Fluorotellurite | Er | 79 | 541 | 100-573 | 488 |
| Tungsten-tellurite | Er/Yb | 28 | 690 | 300-745 | 980 |
| Oxyfluoride glass | Er | 66 | 570 | 293-720 | 488 |
| Fluorophosphate | Er/Yb | 15 | 297 | 77-500 | 980 |
| Glass ceramic | Er/Yb | 16 | 310 | 298-450 | 975 |
| Silicate | Er/Yb | 33 | 296 | 296-723 | 978 |
| Fluoroindate | Er/Yb | 28 | 425 | 125-425 | 406 |

What is claimed is:

1. Fluorophosphate glasses for an active device, comprising:
a metaphosphate composition including $Al(PO_3)_3$;
a fluoride composition including $BaF_2$ and $SrF_2$; and
a dopant composed of $ErF_3$ and $YbF_3$,
wherein the YbF3 is about 3 mol % to about 5 mol %,
the Al(PO3)3 is about 20 mol % to about 30 mol %,
the BaF2 is about 10 mol % to about 60 mol %, and
the SrF2 is about 10 mol % to about 70 mol %.

2. The fluorophosphate glasses of claim 1, wherein the $Al(PO_3)_3$ is about 20 mol %,
the $BaF_2$ is about 40 mol % to about 60 mol %, and
the $SrF_2$ is about 20 mol % to about 40 mol %.

3. The fluorophosphate glasses of claim 1, wherein the $Al(PO_3)_3$ is about 20 mol %,
the $BaF_2$ is about 60 mol %, and
the $SrF_2$ is about 20 mol %.

4. The fluorophosphate glasses of claim 1, wherein the $Al(PO_3)_3$ is about 20 mol %,
the $BaF_2$ is about 50 mol %, and
the $SrF_2$ is about 30 mol %.

5. The fluorophosphate glasses of claim 1, wherein the $Al(PO_3)_3$ is about 20 mol %,
the $BaF_2$ is about 40 mol %, and
the $SrF_2$ is about 40 mol %.

* * * * *